US012607217B2

(12) United States Patent　　(10) Patent No.:　US 12,607,217 B2

McDuff et al.　　(45) Date of Patent:　Apr. 21, 2026

(54) WALL ANCHOR WITH DEFORMABLE EXPANDABLE PART

(71) Applicant: COBRA FIXATIONS CIE LTEE—COBRA ANCHORS CO. LTD., Montreal (CA)

(72) Inventors: Pierre McDuff, Outremont (CA); Lang Nguyen, Dollard-des-Ormeaux (CA)

( * ) Notice: Subject to any disclaimer, the term of this patent is extended or adjusted under 35 U.S.C. 154(b) by 599 days.

(21) Appl. No.: 17/413,914

(22) PCT Filed: Dec. 15, 2019

(86) PCT No.: PCT/CA2019/000168

§ 371 (c)(1),
(2) Date: Jun. 14, 2021

(87) PCT Pub. No.: WO2020/118407

PCT Pub. Date: Jun. 18, 2020

(65) Prior Publication Data

US 2022/0090616 A1　　Mar. 24, 2022

(30) Foreign Application Priority Data

Dec. 14, 2018　(CA) ................................ CA 3027635

(51) Int. Cl.
F16B 13/00　　(2006.01)
F16B 13/12　　(2006.01)

(52) U.S. Cl.
CPC .......... F16B 13/002 (2013.01); F16B 13/124 (2013.01)

(58) Field of Classification Search
CPC .... F16B 13/002; F16B 13/124; F16B 13/066; F16B 13/08; F16B 13/0833;
(Continued)

(56) References Cited

U.S. PATENT DOCUMENTS 791,373 A * 5/1905 Shaffer ................... F16B 15/04
411/359
3,323,404 A * 6/1967 Fischer ................. F16B 13/124
411/71
(Continued)

FOREIGN PATENT DOCUMENTS

EP　　　　1512874 A2 * 3/2005 .......... F16B 13/0833
WO　WO-2005015033 A1 * 2/2005 ............ F16B 13/061
WO　WO-2007082374 A1 * 7/2007 ............ F16B 13/061

*Primary Examiner* — Christine M Mills
*Assistant Examiner* — Dil K. Magar
(74) *Attorney, Agent, or Firm* — DECODE Legal inc.

(57)　　　ABSTRACT

An anchor for hollow walls comprises a main body and an anchor member. The main body includes a proximal end adapted to be engaged by a rotatable tool to rotate the anchor about a longitudinal axis thereof and to cause it to gradually engage a wall, a distal end adapted to cut through the wall as the anchor is rotated, and a shank between the proximal and distal ends. The anchor member includes expandable wings and a body defining a hole, the expandable wings being in registry with respective slots defined in the shank and being displaceable between collapsed and expanded positions, A threaded fastener introduced in the anchor engages the body of the anchor member such that upon sufficient rotation of the fastener, the body of the anchor member retracts towards the proximal end thereby causing the expandable wings to extend outwardly through the slots behind the wall.

17 Claims, 26 Drawing Sheets

(58) Field of Classification Search
    CPC ................ F16B 13/0808; F16B 13/061; F16B
                     13/0891; F16B 13/0866; F16B 13/04;
                     E03C 1/0401; E03C 1/0402
    USPC ......... 411/30, 21–22, 29, 55, 340, 344, 345,
                     411/433, 38, 438
    See application file for complete search history.

(56)                    References Cited

U.S. PATENT DOCUMENTS

| 4,142,440 | A | * | 3/1979 | Schefer | ................ | F16B 13/124 |
| | | | | | | 411/42 |
| 4,453,845 | A | * | 6/1984 | Donan, Jr. | ............ | E21D 21/008 |
| | | | | | | 411/39 |
| 4,636,121 | A | * | 1/1987 | Miller | ..................... | F16B 39/04 |
| | | | | | | 411/21 |
| 4,770,583 | A | * | 9/1988 | Lindberg | ................ | F16B 13/08 |
| | | | | | | 411/340 |
| 4,822,226 | A | * | 4/1989 | Kennedy | ............ | F16B 13/0808 |
| | | | | | | 411/340 |
| 5,173,025 | A | * | 12/1992 | Asami | ................... | F16B 37/043 |
| | | | | | | 411/21 |
| 5,267,423 | A | * | 12/1993 | Giannuzzi | ............... | F16B 39/24 |
| | | | | | | 411/533 |
| 5,603,593 | A | * | 2/1997 | Fischer | ................ | F16B 13/124 |
| | | | | | | 411/55 |
| 5,690,454 | A | * | 11/1997 | Smith | ................... | F16B 13/061 |
| | | | | | | 411/908 |
| 6,186,716 | B1 | * | 2/2001 | West | ..................... | F16B 13/002 |
| | | | | | | 411/30 |
| 6,884,012 | B2 | * | 4/2005 | Panasik | ............... | F16B 13/0833 |
| | | | | | | 411/29 |
| 7,654,781 | B2 | * | 2/2010 | McDuff | ................ | F16B 13/061 |
| | | | | | | 411/30 |
| 7,682,116 | B2 | * | 3/2010 | Cabrele | ................. | F16B 13/124 |
| | | | | | | 411/451.3 |
| 8,142,122 | B2 | * | 3/2012 | McDuff | ................ | F16B 13/061 |
| | | | | | | 411/75 |
| 9,353,782 | B2 | * | 5/2016 | McDuff | ................ | F16B 13/002 |
| 2003/0002951 | A1 | * | 1/2003 | Wakai | ................... | F16B 13/061 |
| | | | | | | 411/37 |
| 2003/0206784 | A1 | * | 11/2003 | Huang | .................. | F16B 13/002 |
| | | | | | | 411/29 |
| 2005/0053444 | A1 | * | 3/2005 | Panasik | ............... | F16B 13/0833 |
| | | | | | | 411/340 |
| 2005/0158139 | A1 | * | 7/2005 | Hepworth | ............. | F16B 13/124 |
| | | | | | | 411/55 |
| 2006/0072979 | A1 | * | 4/2006 | McDuff | ................ | F16B 13/061 |
| | | | | | | 411/30 |
| 2006/0165506 | A1 | * | 7/2006 | Panasik | ................ | F16B 13/002 |
| | | | | | | 411/30 |
| 2006/0193712 | A1 | * | 8/2006 | Kuna | ................... | E03C 1/0403 |
| | | | | | | 411/340 |
| 2007/0166122 | A1 | * | 7/2007 | McDuff | ................ | F16B 13/061 |
| | | | | | | 411/387.1 |
| 2007/0258787 | A1 | * | 11/2007 | Hsu | ........................ | F16B 13/122 |
| | | | | | | 411/61 |
| 2008/0131231 | A1 | * | 6/2008 | Kuna | ................... | E03C 1/0402 |
| | | | | | | 411/433 |
| 2009/0252571 | A1 | * | 10/2009 | Zimmerer | ............. | F16B 13/124 |
| | | | | | | 411/25 |
| 2012/0257944 | A1 | * | 10/2012 | McDuff | ............... | F16B 13/124 |
| | | | | | | 411/21 |
| 2017/0051772 | A1 | * | 2/2017 | McDuff | ................ | F16B 13/002 |
| 2022/0034347 | A1 | * | 2/2022 | McDuff | ................ | F16B 13/061 |
| 2024/0271650 | A1 | * | 8/2024 | McDuff | ................ | F16B 13/002 |

* cited by examiner

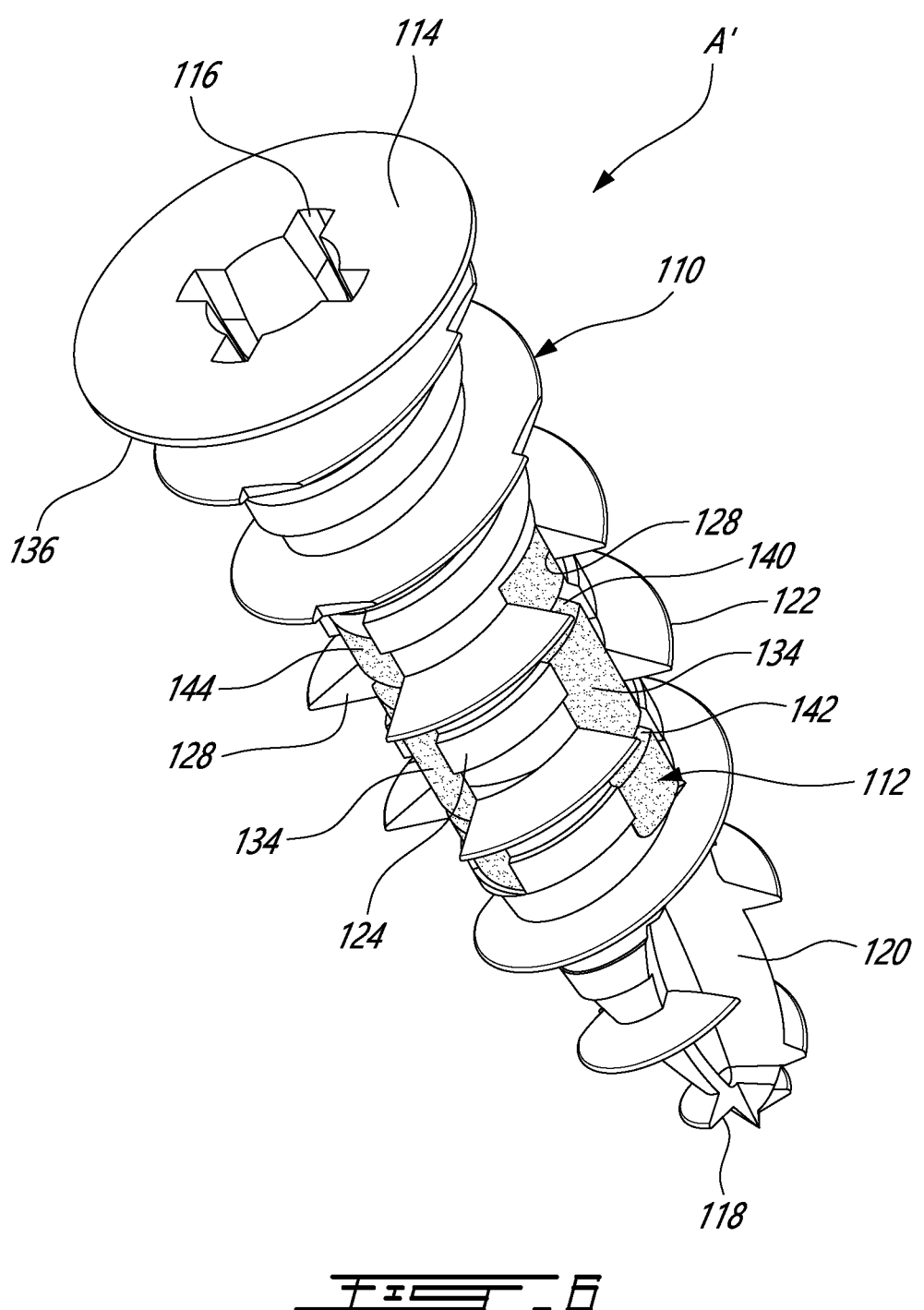
_FIG. 6_

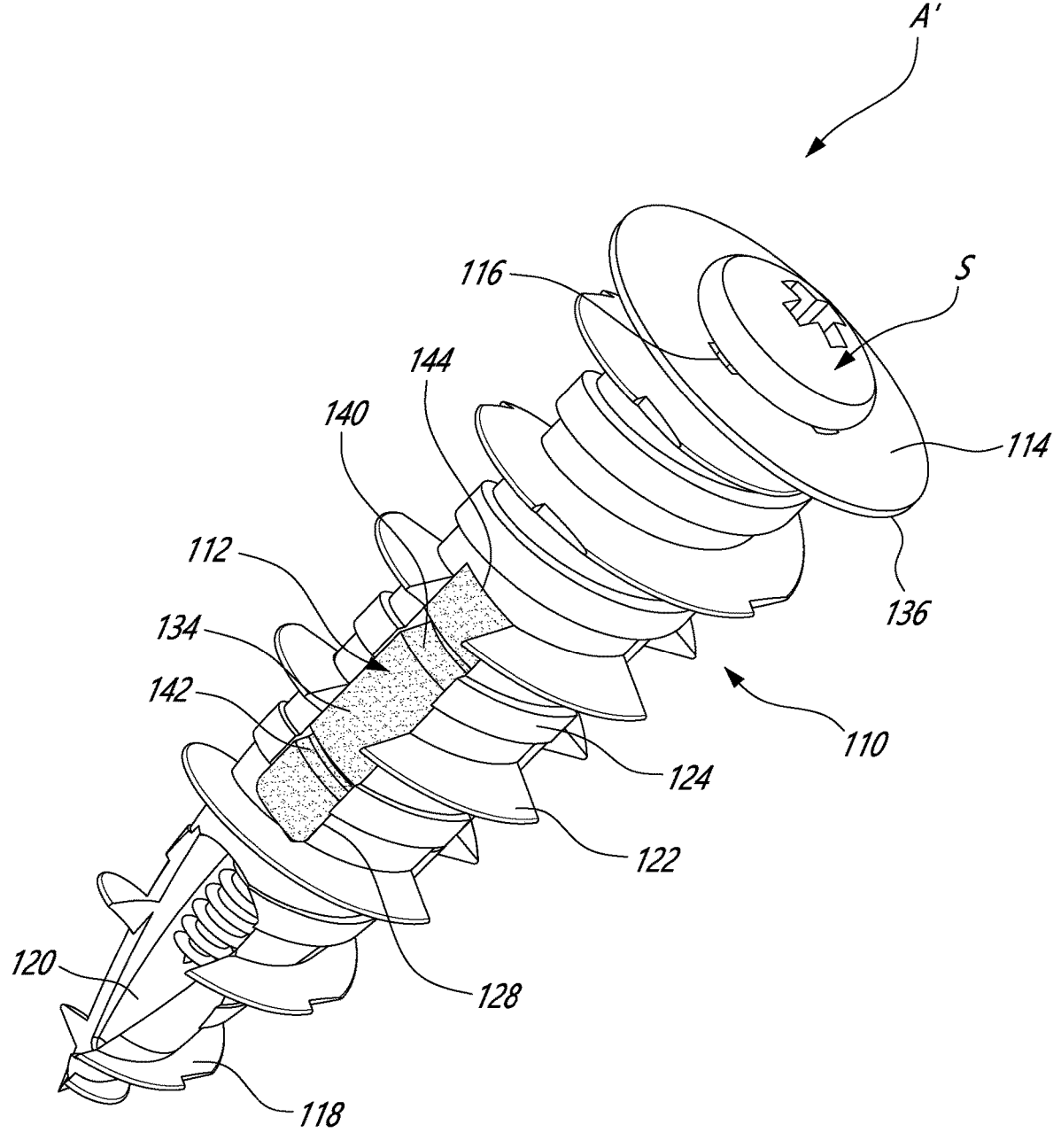
_FIG. 15A_

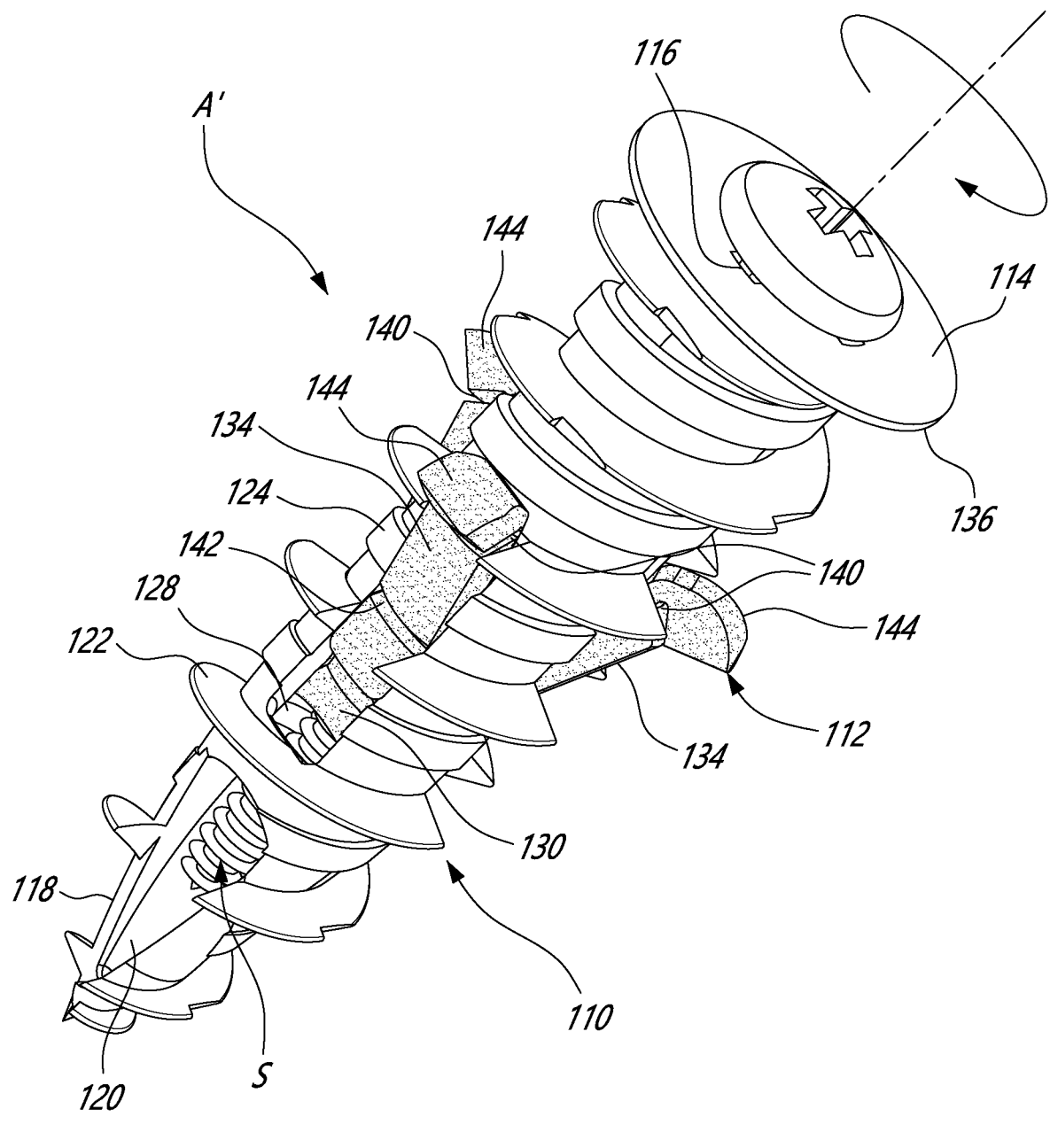
_FIG. 15B_

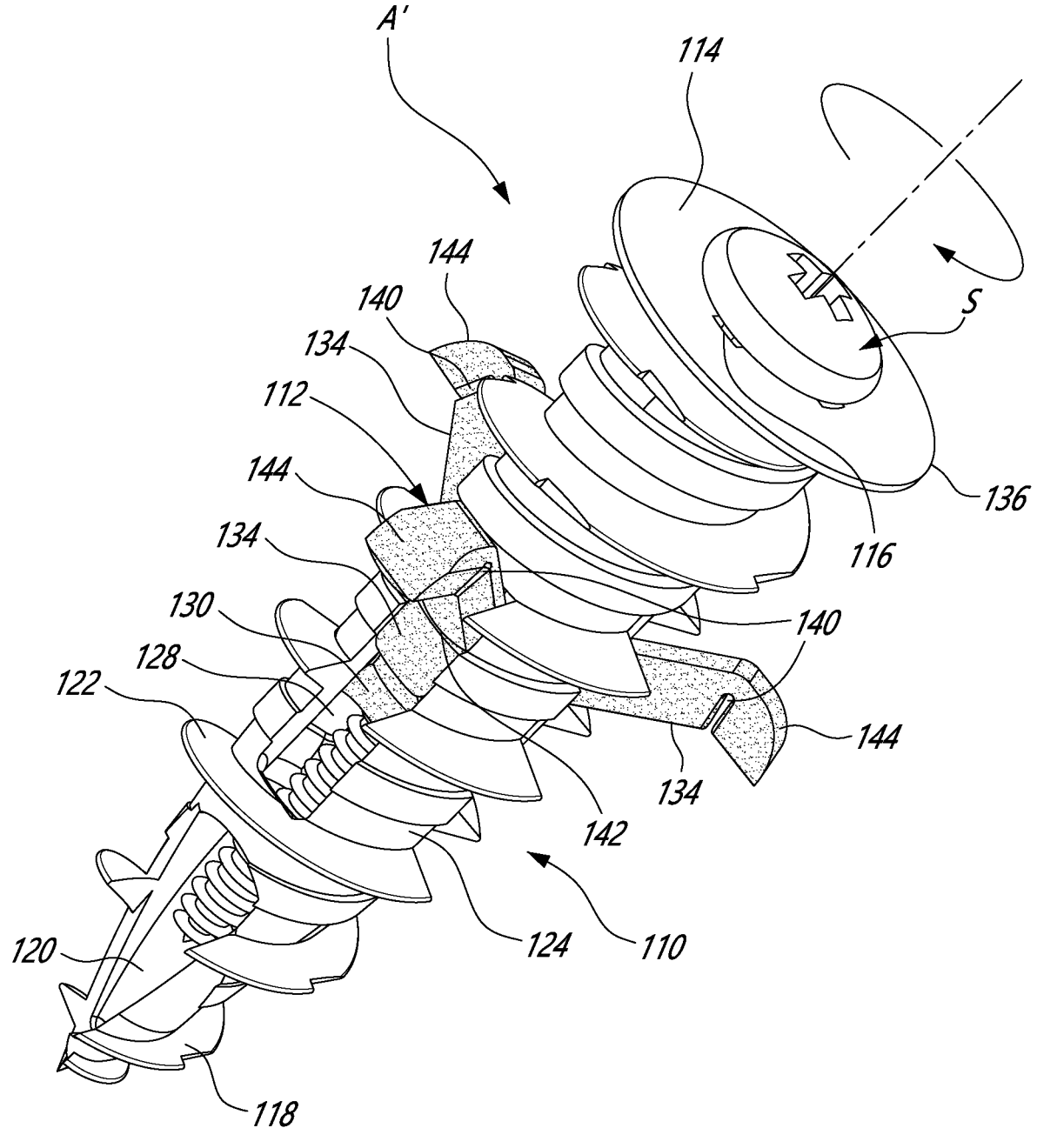
_F=G_15C

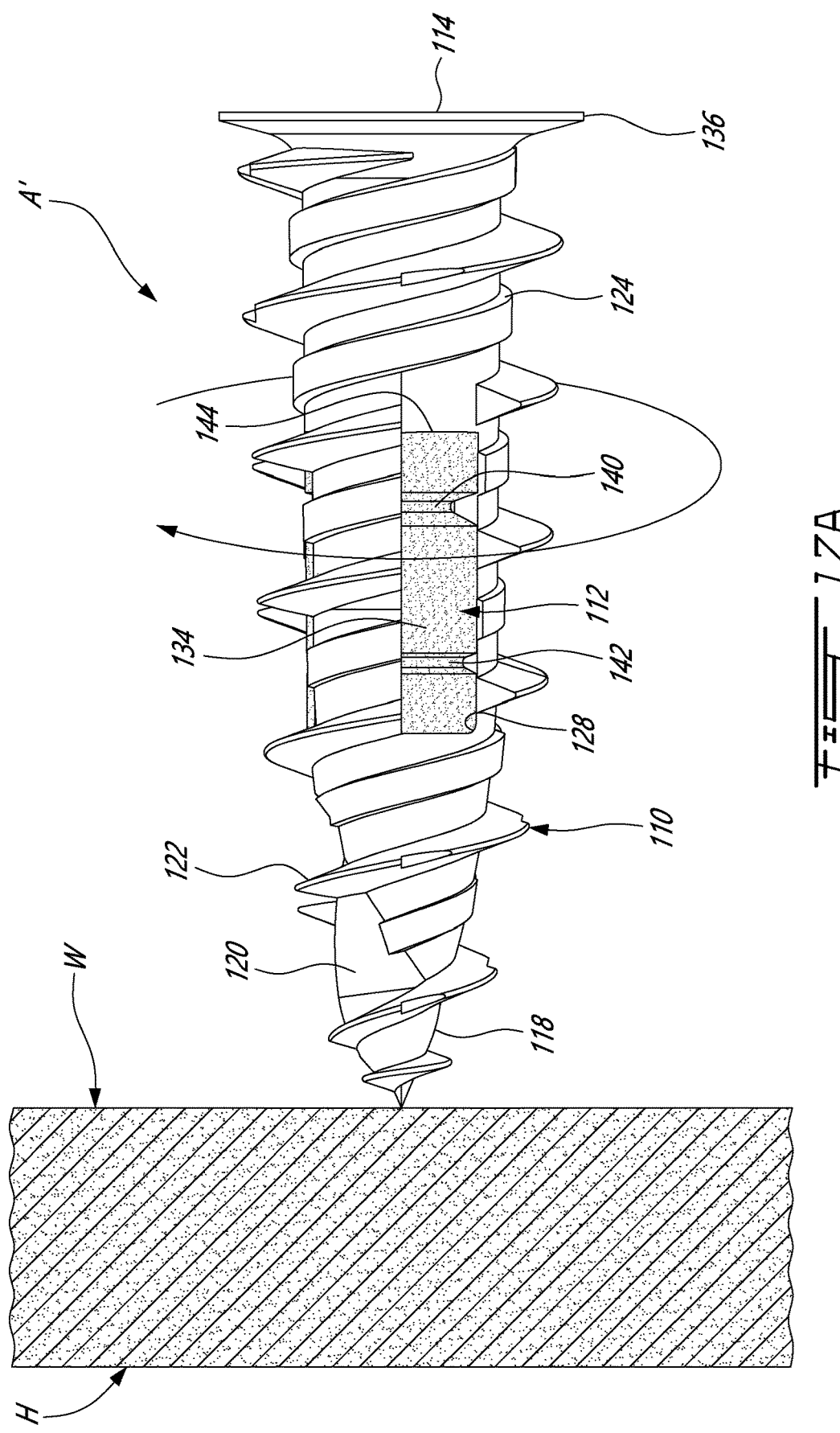
_FIG._17A

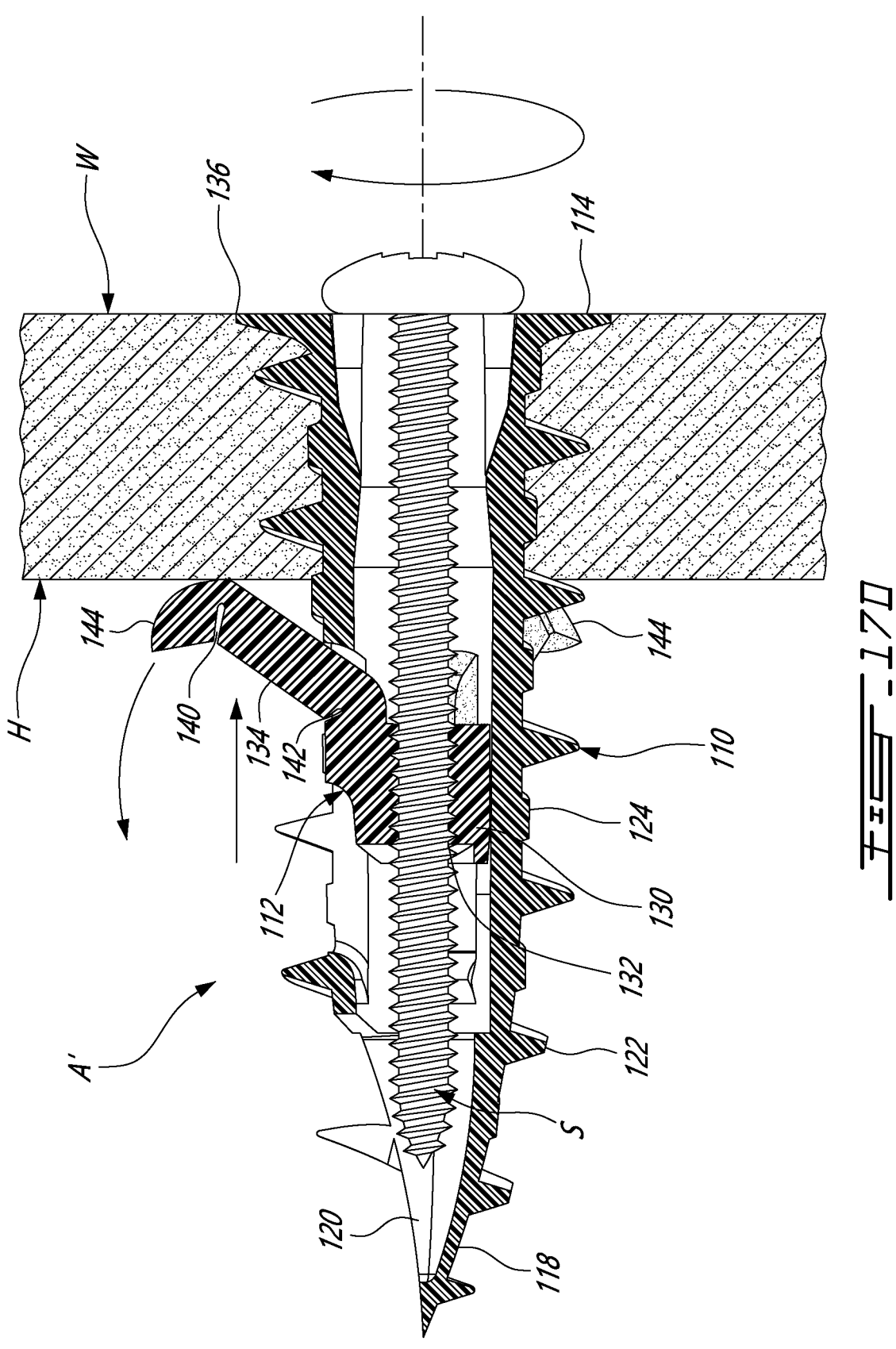
_FIG. 170_

WALL ANCHOR WITH DEFORMABLE EXPANDABLE PART

CROSS REFERENCE TO RELATED APPLICATIONS

This Application claims priority on Canadian Patent Application No. 3,027,635, now pending, filed on Dec. 14, 2018, which is herein incorporated by reference.

FIELD

The present subject matter relates to wall anchors and, more particularly, to self-drilling anchors for use typically in hollow walls made of friable materials, e.g. plasterboard, gypsum, etc.

BACKGROUND

The Ernst et al, Gianuzzi and McSherry U.S. Pat. Nos. 4,601,625, 5,234,299 and 5,529,449, respectively, each disclose an anchor which is turned in a wall made of friable material and is retained in the wall by virtue of the friable material being compressed between the root and deep thread spiraled along the cylindrical body of the anchor and between the proximal end of the thread and flanged end of the anchor which becomes embedded in the front surface of the wall. A work piece is then fastened to the wall by a screw fastener that is screwed into the visible open end of the anchor and holds the workpiece between the flanged end of the anchor and the head of the screw fastener.

Toggle bolts are also known, such as in U.S. Pat. No. 6,435,789 issued on Aug. 20, 2002 to Gaudron. Generally, a self-drilling toggle anchor includes a drilling member and a toggle member. The drilling member is adapted to drill through the wall hole with the toggle member in its retracted position, i.e. extending axially along the drifting member, whereby the whole anchor is inserted longitudinally in the wait with the toggle member being located completely behind the wall. The toggle member defines a threaded opening that extends transversally therethrough and that has, in the retracted position of the toggle member, its axis perpendicular to the drilling member and to the longitudinal orientation of the whole anchor when it drilled into the wall. In a second step, a screw is rotatably inserted in the anchor and, at one point, a tip of the screw engages the toggle member and causes it to pivot an extended position thereof, wherein the toggle member extends at right angles to the drilling member and to the general orientation of the anchor. The screw then engages the threaded opening of the toggle member. Once the head of the screw abuts the front of the wall or the head of the anchor, it cannot displace longitudinally, such that further rotation of the screw draws the toggle member translationally towards the head of the screw and thus towards the rear face of the wall until is abuts firmly the same, whereby the anchor is fixed to the wall. Alternatively, the drilling tip can be provided on the toggle member, and in such cases, the above drilling member remains similar in that it fixedly depends from the anchor head but it does not perform the drilling action. Such designs are somewhat costly, as the anchor requires two distinct components (e.g. the above drilling and toggle members) that also must be assembled together.

There is also U.S. Pat. No. 5,833,415 issued on Nov. 10, 1998 to McSherry, which discloses a self-centering wall anchor (10, 100) having an outwardly threaded hollow cylindrical body (101, 111) with a flanged proximal end and a cutting distal end. The hollow cylindrical body diminishes in diameter toward the distal cutting end (20, 110) in the form of a pointed dome with a pointed centering tip (22, 103) at the center axis of the anchor. An inner bore (14, 105) extends continuously from its opening at the proximal end of the anchor along the center axis of the cylindrical body to the centering tip at the distal end where it is partially closed because of the disposition of the centering tip at the center axis. The distal end of the bore is in the form of a deep flute (21, 105a) which communicates aid is part of the inner bore and is defined at its outer edges by a leading cutting edge (23, 107) and a trailing edge (24, 108) of the single cutter, with the leading cutting edge extending from the pointed tip in a curved distention. In one instance, the outer thread extends to the centering tip and is interrupted in the area of the bore opening to assure optimum access to material cut from the wall as the anchor is rotated.

Furthermore, U.S. Pat. No. 7,654,781, which issued on Feb. 2, 20101 to McDuff et al., which discloses an anchor (910) for mounting to a hollow wall (W) made of friable material comprises a proximal flanged end (918) adapted to be engaged by a rotatable tool (B) to rotate the anchor (910) about a longitudinal axis (A) thereof and to cause it to gradually engage the wall (W). The anchor (910) also includes a distal end (912) adapted to cut through the wall (W) as the anchor (910) is rotated, and a shank (920) extending between the proximal and distal ends (918, 912). The shank (920) includes at least one expandable leg (924) that is it a collapsed position thereof when the anchor (910) is rotated to mount it to the wall (W) and that is located distally beyond a non visible surface of the wall (W) once the anchor (910) has been mounted to the wall and is in a first position thereof. The wall anchor (910) includes an outer thread (922) that securely engages the wall (W). A threaded fastener (B), e.g. a screw, is adapted to be introduced in the anchor (910) and to threadably engage the same distally of the leg (924) such that sufficient rotation of the threaded fastener (B) retracts the distal end (912) towards the proximal end (918) thereby causing the leg (924) to displace to a laterally expanded position thereof and to engage the non visible surface of the wall (W).

It would therefore be desirable to provide a self-drilling anchor assembly typically for use with a fastener in hollow walls.

SUMMARY

It would thus be desirable to provide a novel anchor assembly typically for use with a fastener in hollow walls.

The embodiments described herein provide in one aspect a wall anchor for mounting to a hollow wall, comprising a main body and an anchor member, the main body including a proximal end adapted to be engaged by a rotatable tool to rotate said anchor about a longitudinal axis thereof and to cause it to gradually engage a wall, a distal end adapted to cut through the wall as said anchor is rotated, and a shank between said proximal and distal ends, said shank defining at least one slot, the anchor member including at least one expandable wing and a body defining a hole, the expandable wing being in registry with the slot and being displaceable between inwardly collapsed and outwardly expanded positions, said expandable wing being in the collapsed position thereof when said anchor is rotated to mount it to the wall and being located distally past a rear surface of the wall once said anchor is mounted to the wall, said anchor being adapted to receive therein a threaded fastener and to threadably engage the body of the anchor member distally of said wing such that sufficient rotation of the threaded fastener retracts said body of the anchor member towards said proximal end thereby causing said expandable wing to extend outwardly through the slot to the expanded position of the expandable wing.

BRIEF DESCRIPTION OF THE DRAWINGS

For a better understanding of the embodiments described herein and to show more clearly how they may be carried into effect, reference will now be made, by way of example only, to the accompanying drawings, which show at least one exemplary embodiment, and in which:

FIGS. 2C and 2D are side elevation views of the wall anchor of FIG. 1, but shown in an initial position thereof, prior to installation in the wall;

FIGS. 6 and 7 are perspective views of a wall anchor in accordance with another exemplary embodiment, which is shown an initial position thereof, prior to installation in the wall;

FIGS. 15A to 15C are sequential front perspective views of the wall anchor of FIGS. 6 to 8, which is shown with a fastener inserted therein, the successive views showing three positions of the deformable anchor member up to an expanded position of wall anchor, in accordance with an exemplary embodiment, these views being exempt for illustration purposes of a wall into which the wall anchor would be installed

FIGS. 17A to 17D are successive partly cross-sectional schematic side views showing the installation of the wall anchor of FIGS. 6 to 8 into the wall, in accordance with an exemplary embodiment, with FIG. 17D showing the wall anchor in an expanded and installed position thereof in the wall.

DESCRIPTION OF VARIOUS EMBODIMENTS

Figure 1:
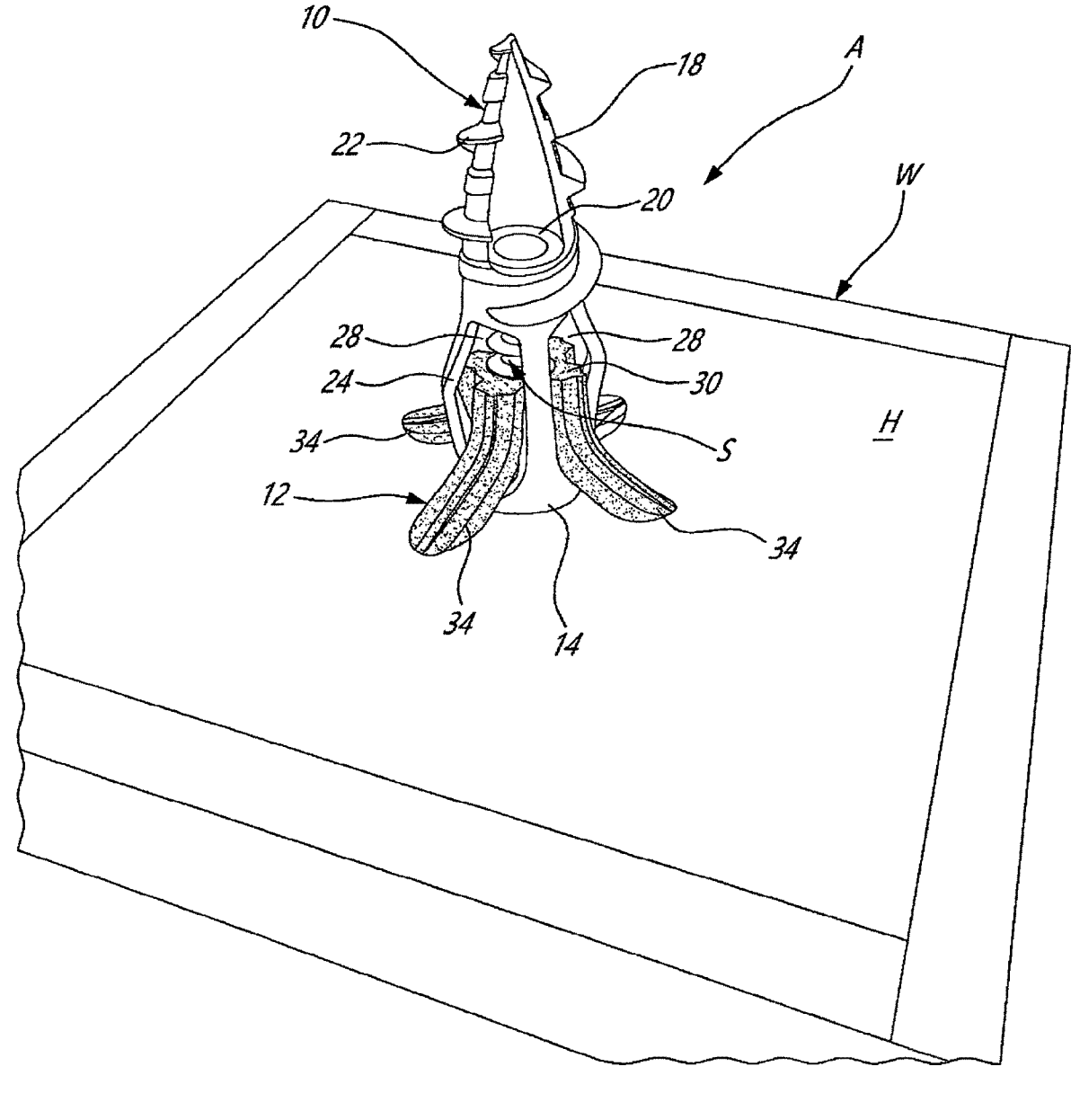
FIG. 1 is a perspective view of a wall anchor in accordance with an exemplary embodiment, which is shown in an expanded and installed position thereof in a wall and seen from a hidden side of the wall.
Figure 2A:
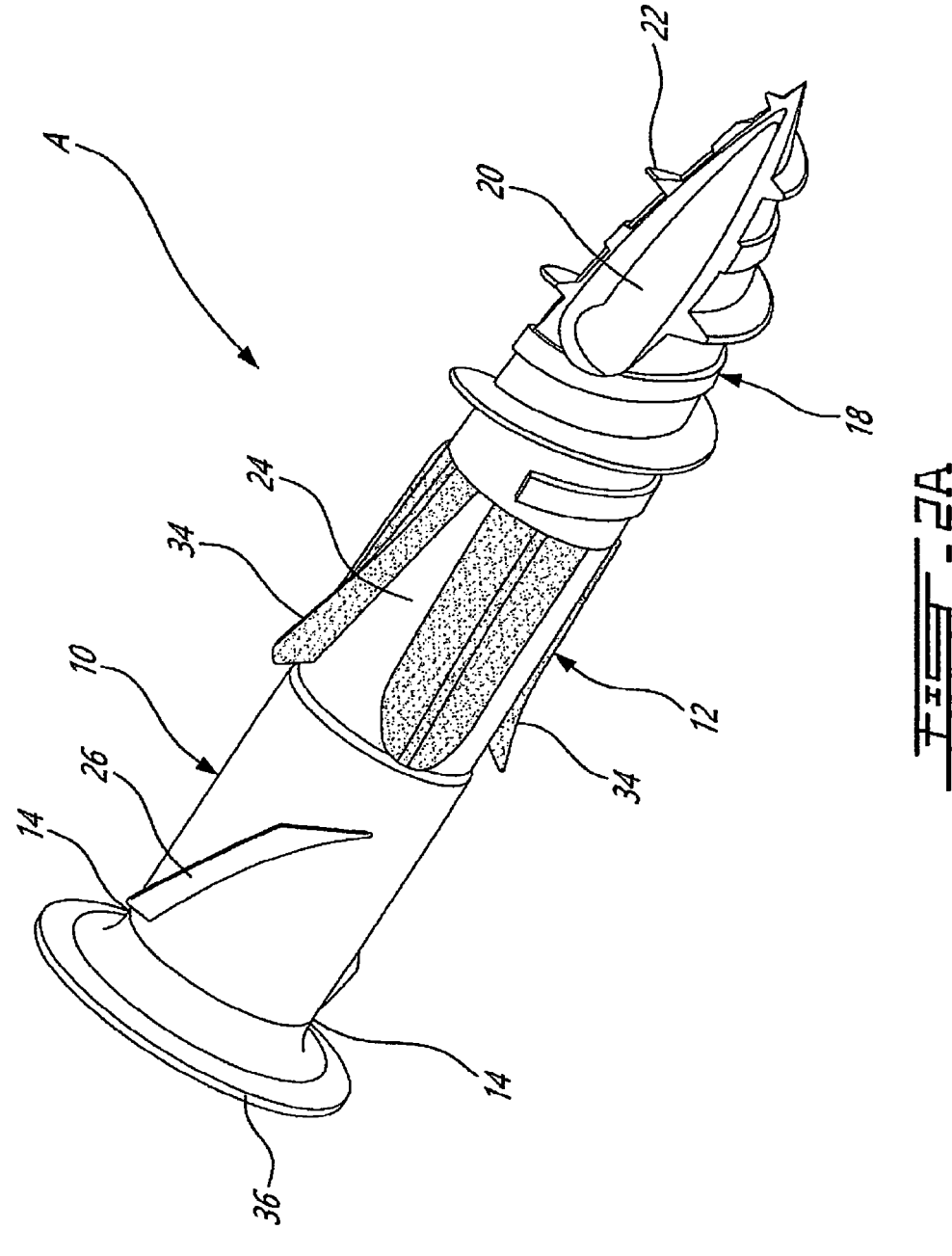
FIGS. 2A and 2B are perspective views of the wall anchor of FIG. 1, but shown in an initial position thereof, prior to installation in the wall.
Figure 2B:
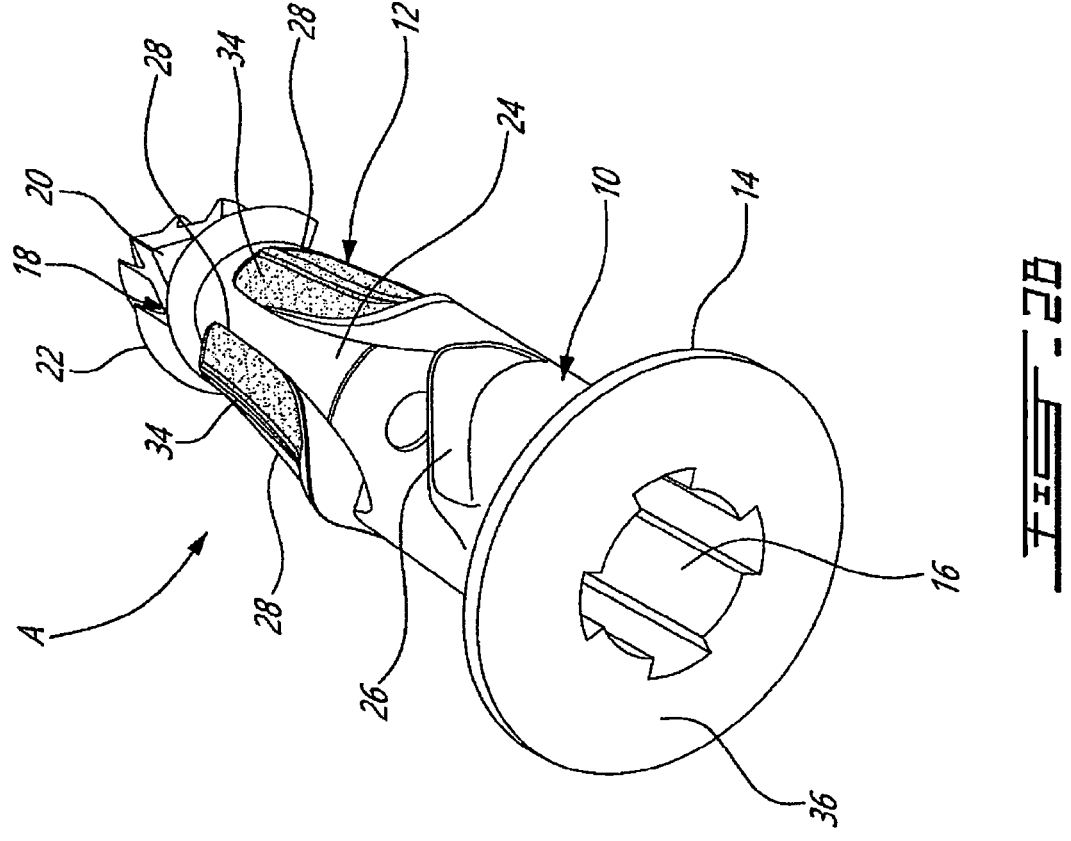
Figure 2C:
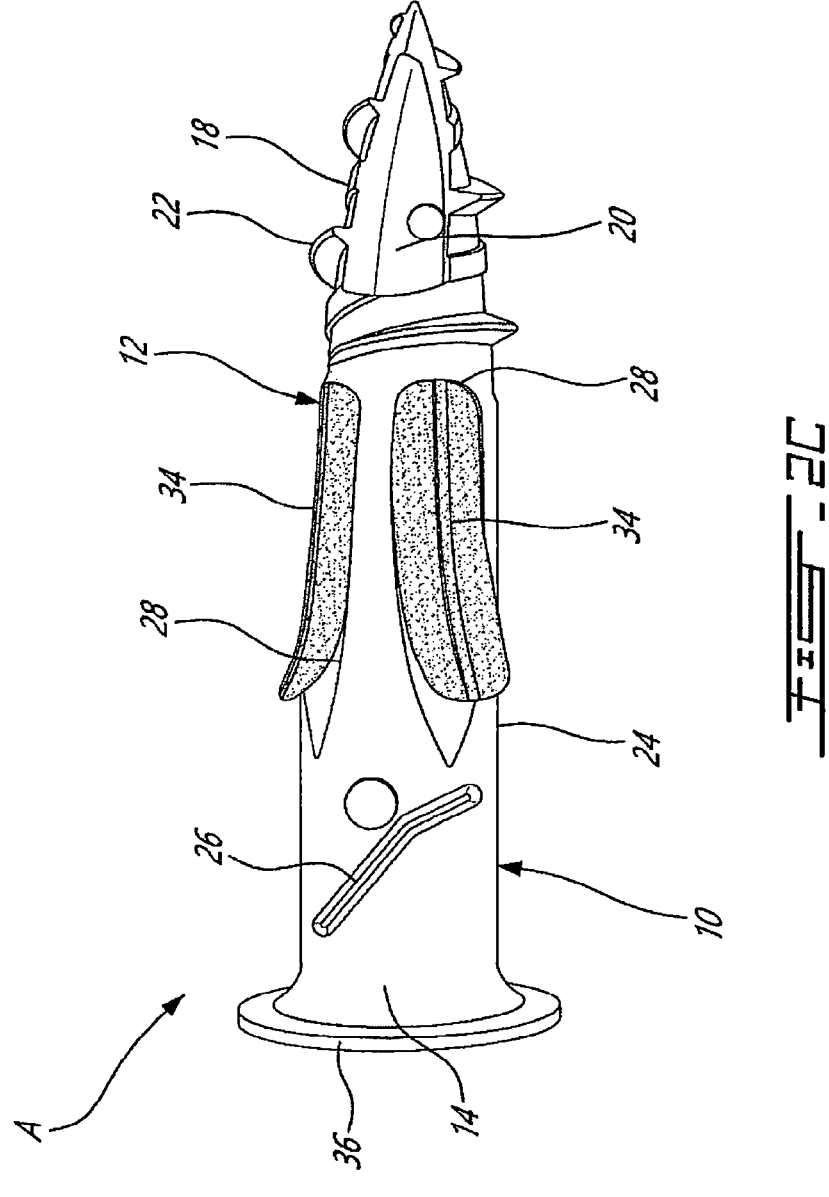
Figure 20:
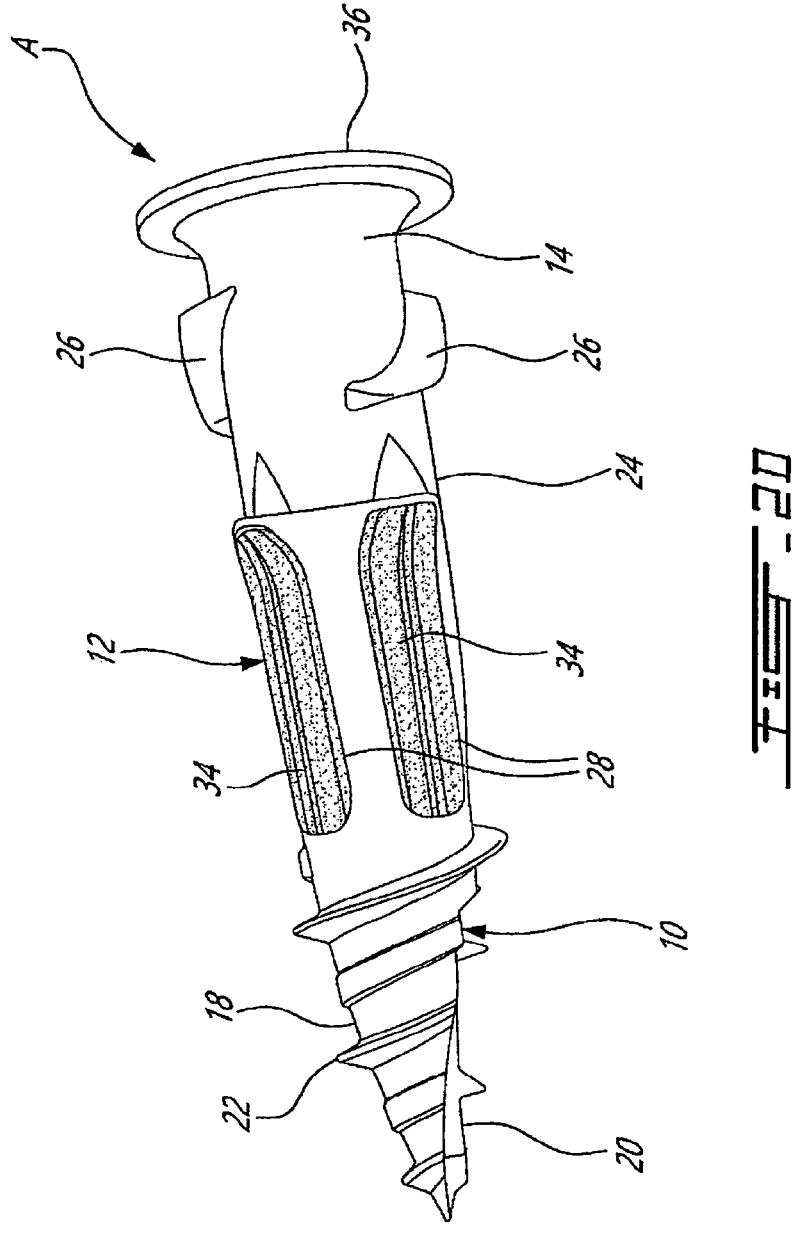
Figure 3A:
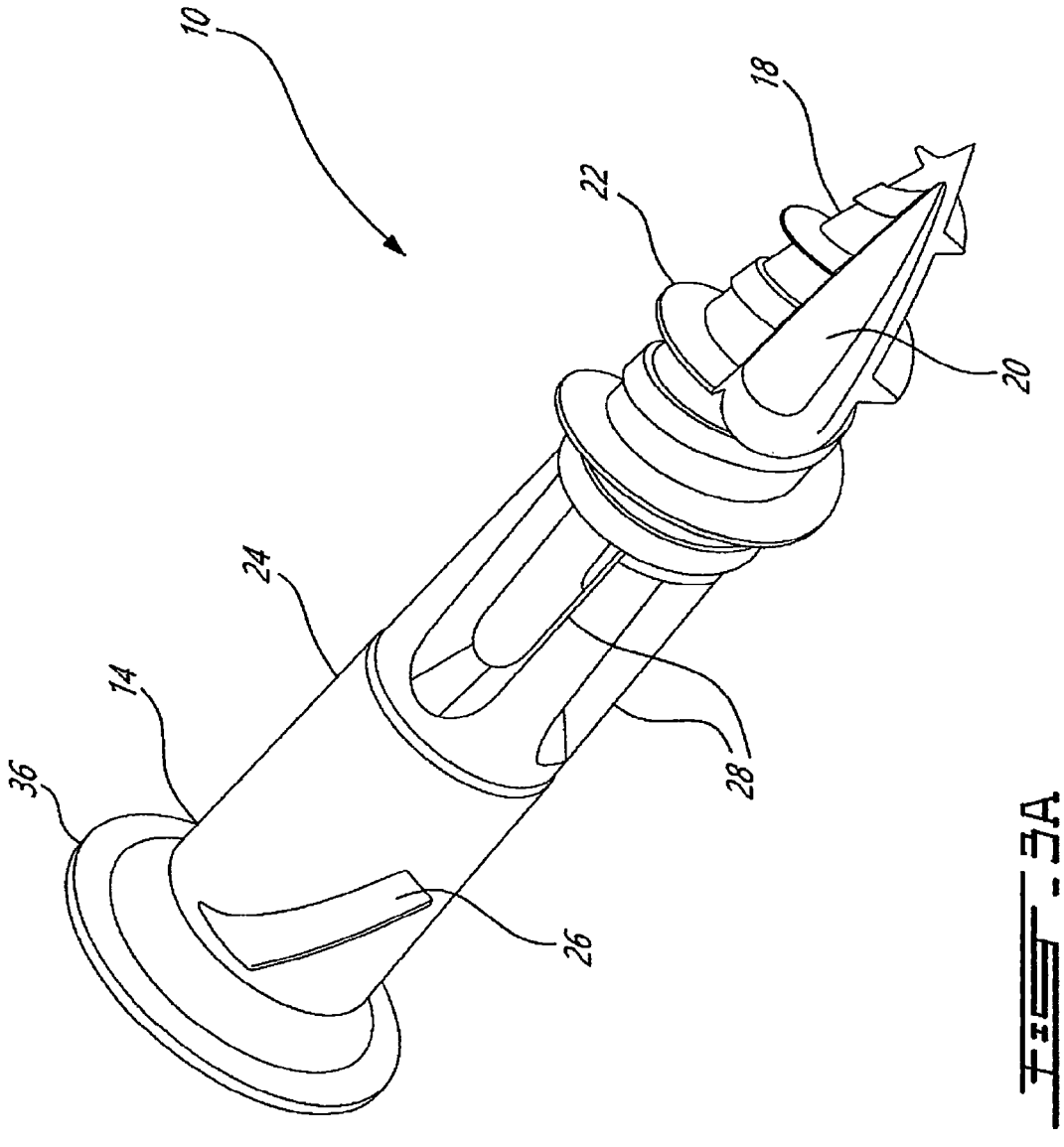
FIG. 3A is a perspective view of a rigid main body of the wall anchor of FIG. 2, in accordance with an exemplary embodiment.
Figure 3B:
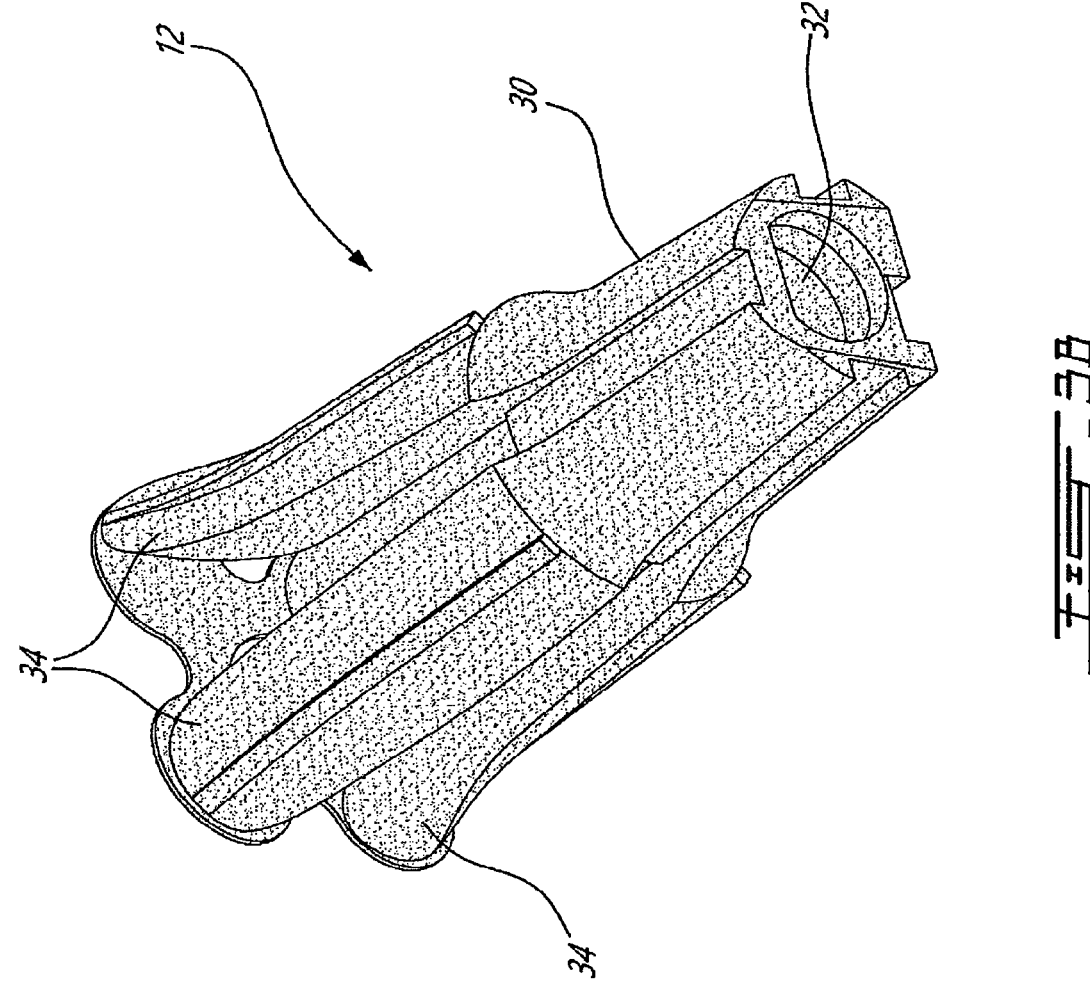
FIG. 3B is a perspective view of a deformable anchor member of the wall anchor of FIG. 2, in accordance with an exemplary embodiment.

FIGS. 1 to 5 illustrate a self-drilling wall anchor A, which is adapted to be mounted to a wall W for use with a fastener, such as a screw. The wall anchor A includes a rigid main body 10 and deformable anchor member 12.

The main body 10 includes a flanged proximal head 14 adapted to be engaged for instance by a powered bit, e.g. Philips, via a cruciform recess 16 defined in the proximal head 14. The main body 10 also includes a distal end 18, defining an open flute or opening 20, and an outer thread 22 interrupted by the flute 20. The distal end 18 is adapted to dig into the wall W and allow the anchor A to penetrate therein.

Between the proximal head 14 and the distal end 18, the main body 10 includes a central substantially cylindrical section 24, which includes a pair of fins 26 adapted to be lodged in the wall W once the anchor A has been installed therein. The cylindrical section 24 also defines four longitudinal slots 28.

The deformable anchor member 12 includes a rigid body 30 defining a hole 32 that is adapted to be tapped by a screw S, and four (4) deformable expansion wings or legs 34. The anchor member 12 is positioned within the cylindrical section or shank 24 of the main body 10, and with the deformable expansion legs 34 being lodged in the slots 28. The hole 32 could also define inner female threads that are adapted to mate with the male threads of the screw S.

To install the wall anchor A in the wall W, a screwdriver bit is inserted in the recess 16 and the distal end 18 is abutted onto the wall W, typically on a visible surface of a hollow wall. The screwdriver bit is rotated (typically via a powered drill) such that the distal end pierces the wall W and the anchor A is gradually introduced in the wall, that is until a flange 36 of the proximal head 14 reaches the wall W. In this position, the anchor member 12 is located behind the wall and the fins 26 are lodged in the wall W.

Figure 4:
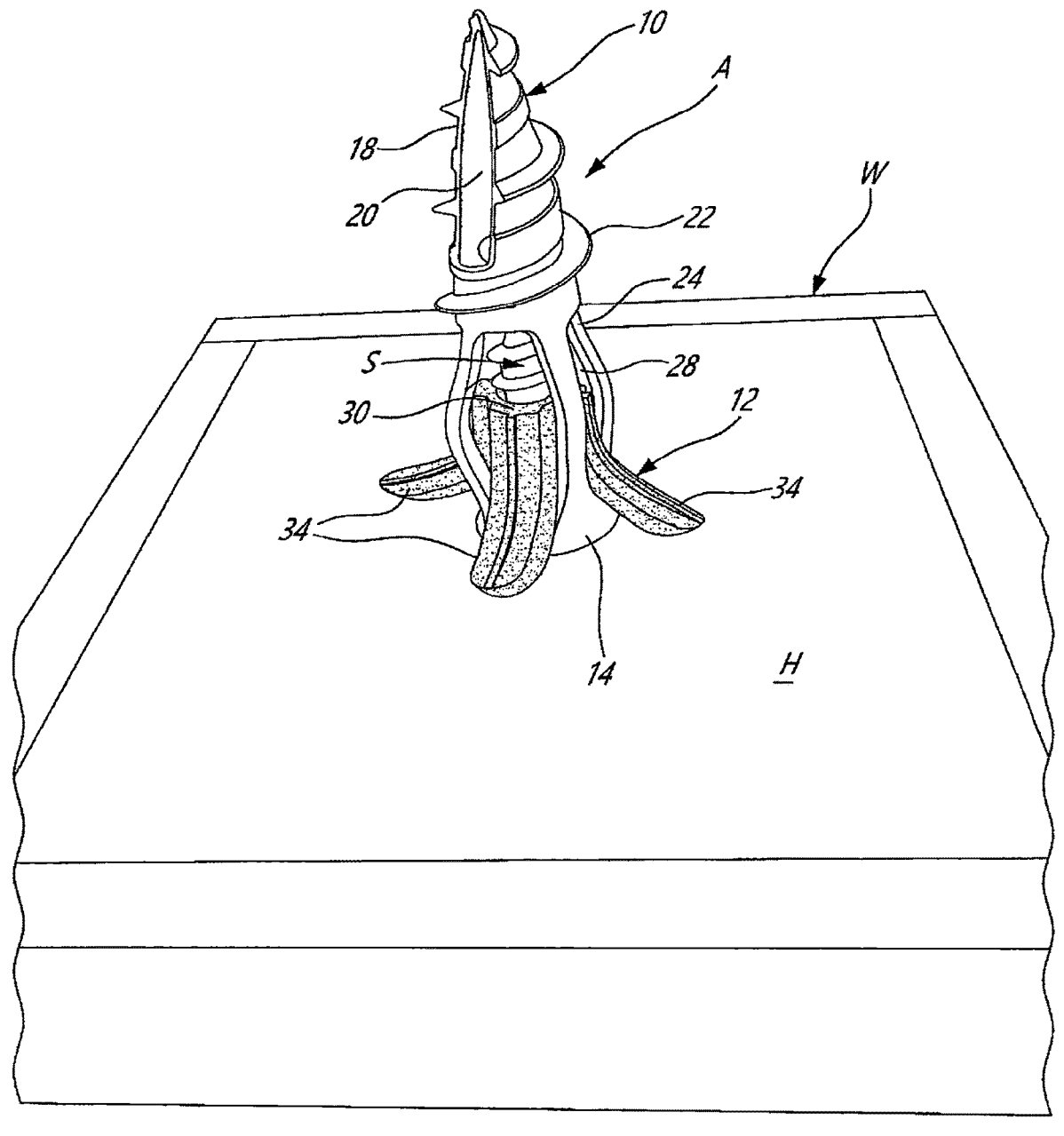
FIG. 4 is a further perspective view of the wall anchor of FIG. 1, which is shown in the expanded and installed position thereof in the wall and seen from a hidden side of the wall.
Figure 5:
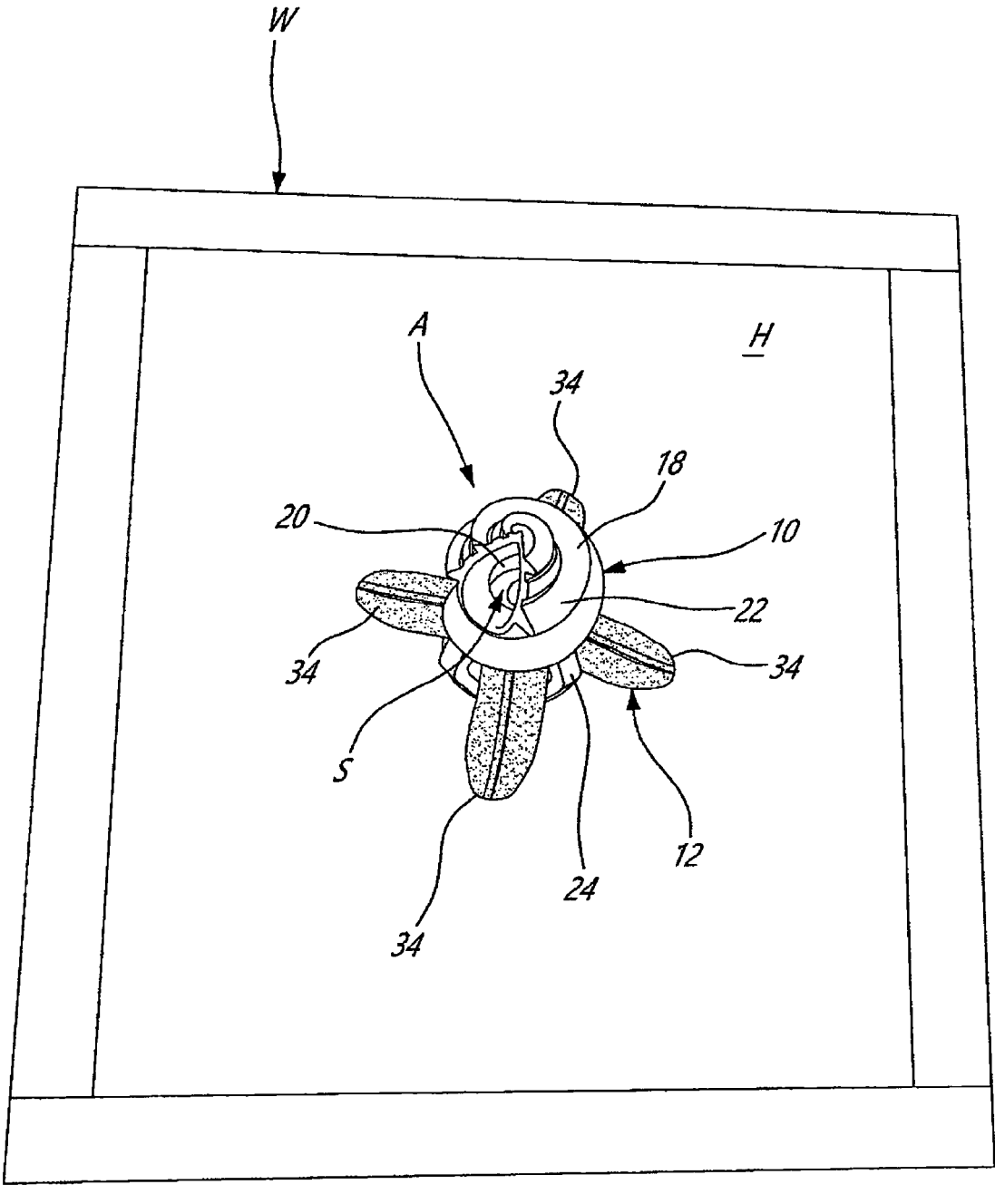
FIG. 5 is a top plan view of the wall anchor of FIGS. 1 and 4, which is shown in the expanded and installed position thereof in the wall and seen from a hidden side of the wall.

Then, the screw S is introduced in the anchor A via the recess 16, and the screw S is adapted to eventually engage the rigid body 30 of the anchor member 12 at the hole 32 thereof. Once a head of the screw S reaches the flange 36 of the proximal head 14, the screw S cannot further translationally advance, whereby continued rotation thereof (via the bit) causes the rigid body 30 to displace towards the wall W, thereby causing the deformable expansion legs 34 thereof to expand outwardly, through the slots 28, and into a general cruciform configuration, as seen in FIGS. 1, 4 and 5. The expanded legs 34 abut the hidden side H of the wall W, thereby preventing the wall anchor A from being pulled out of the wall W, with the wall anchor being thus firmly engaged to the wall W.

Figure 7:
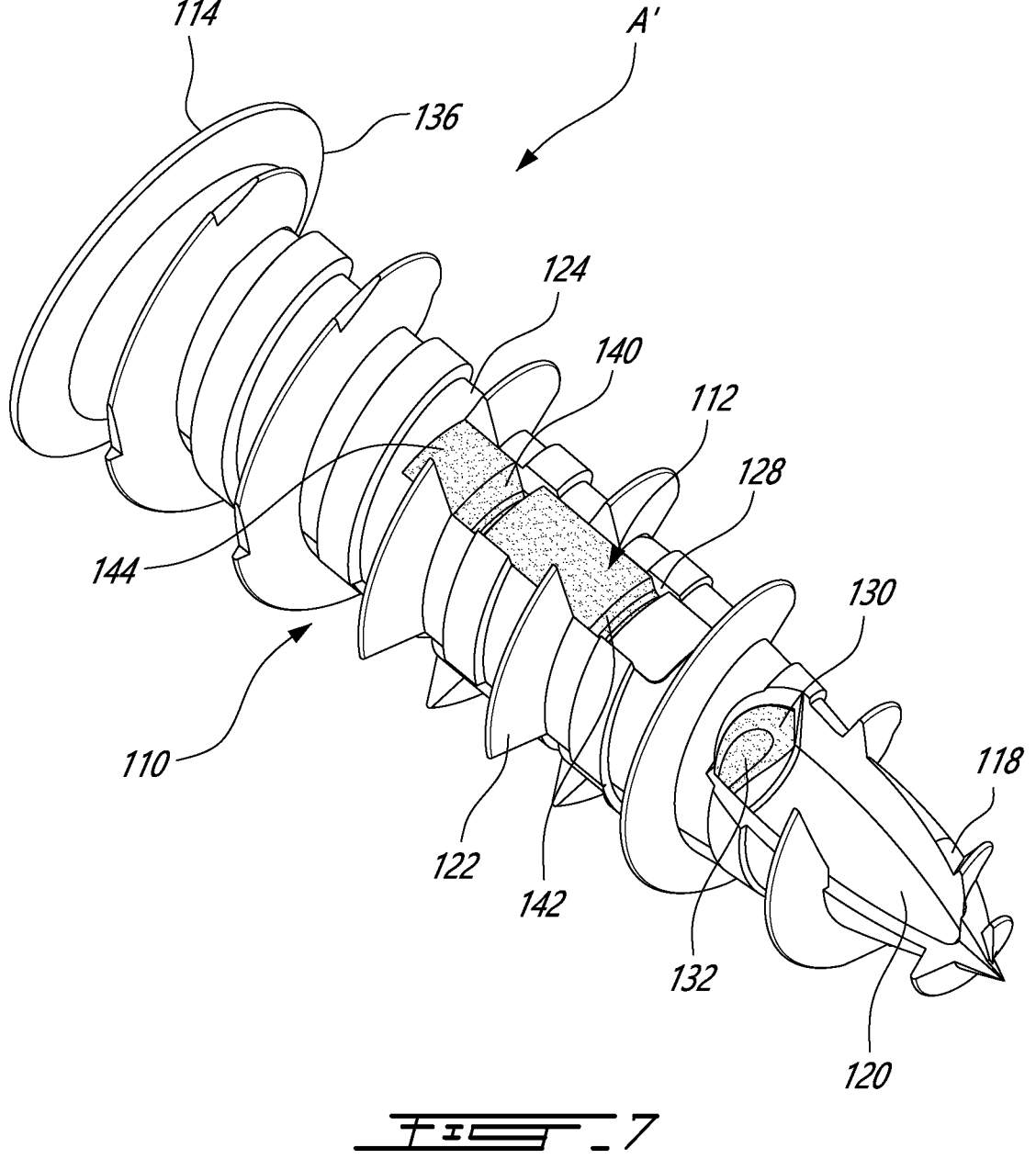
Figure 8:
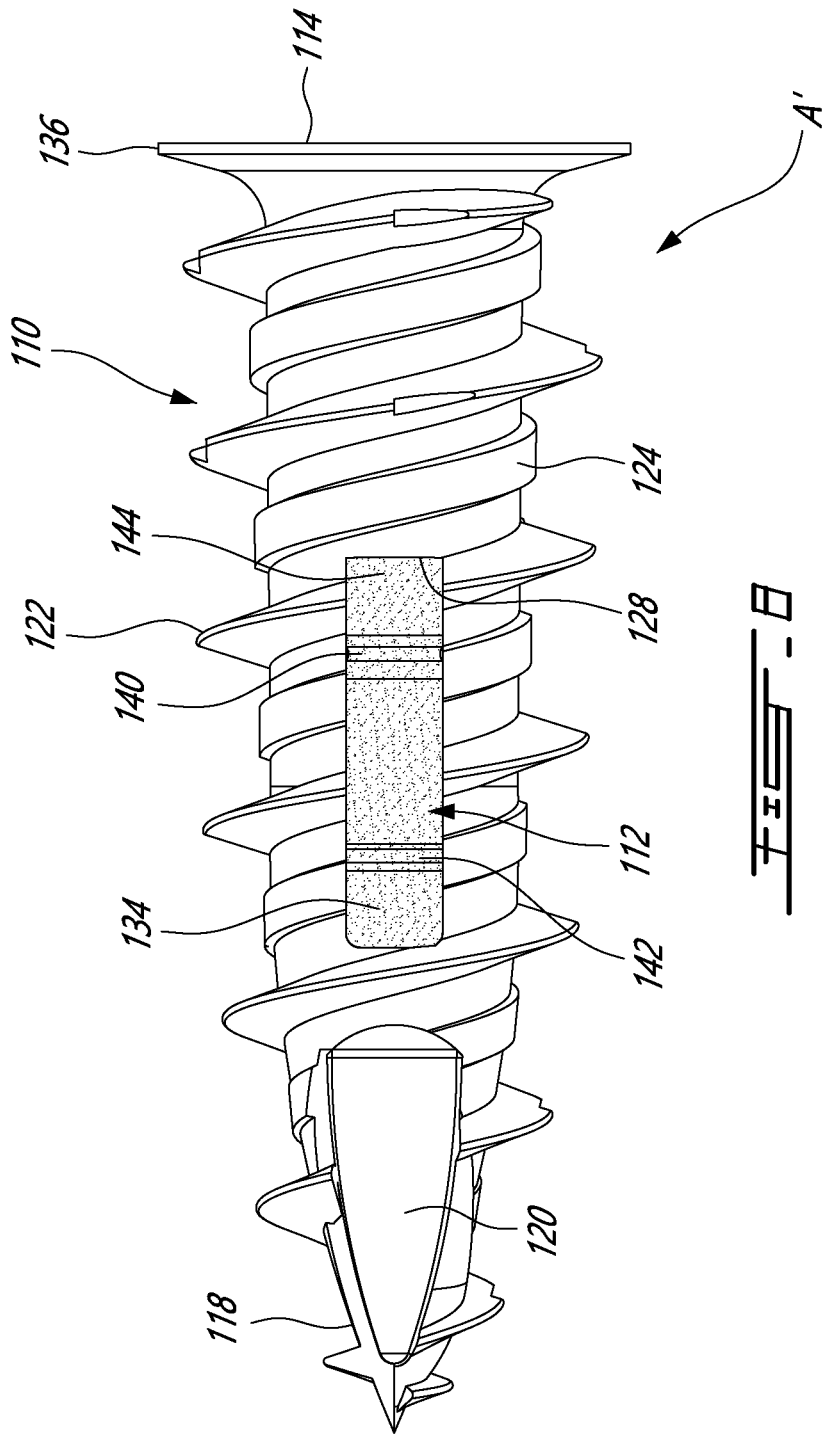
FIG. 8 is a side elevation view of the wall anchor of FIGS. 6 and 7.
Figure 9:
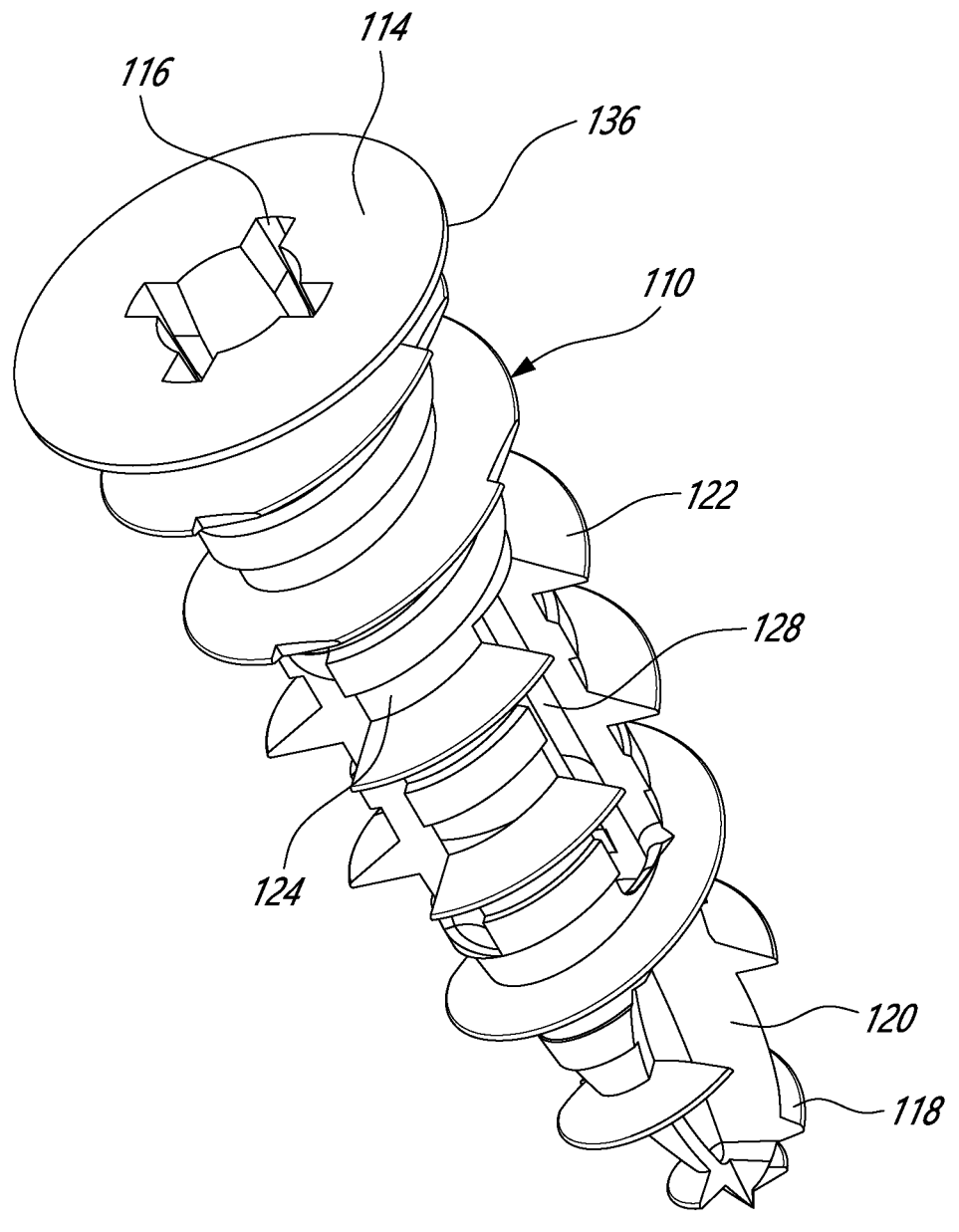
FIGS. 9 and 10 are perspective views of a main body of the wall anchor of FIGS. 6 to 8, in accordance with an exemplary embodiment.
Figure 10:
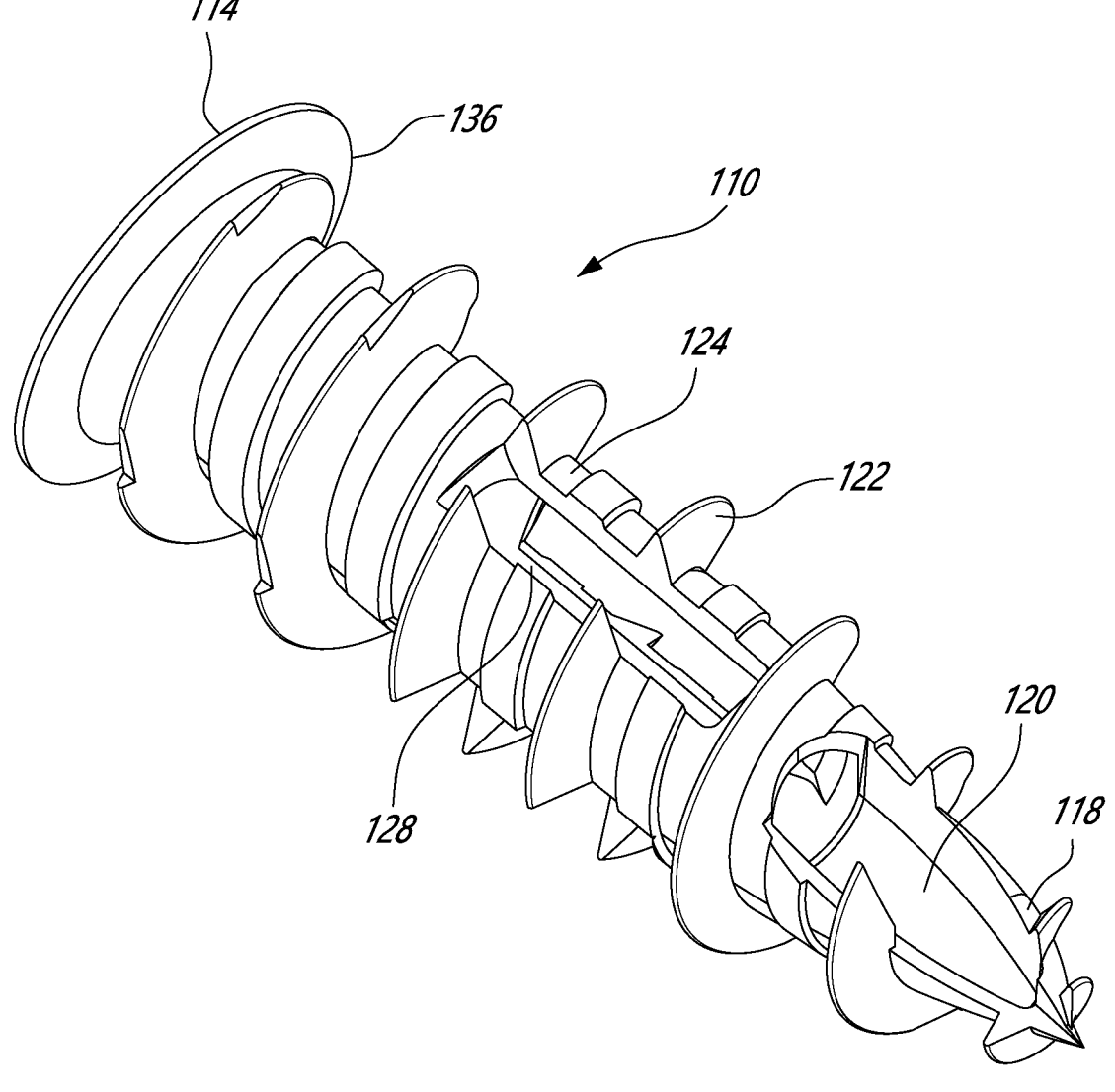
Figure 11:
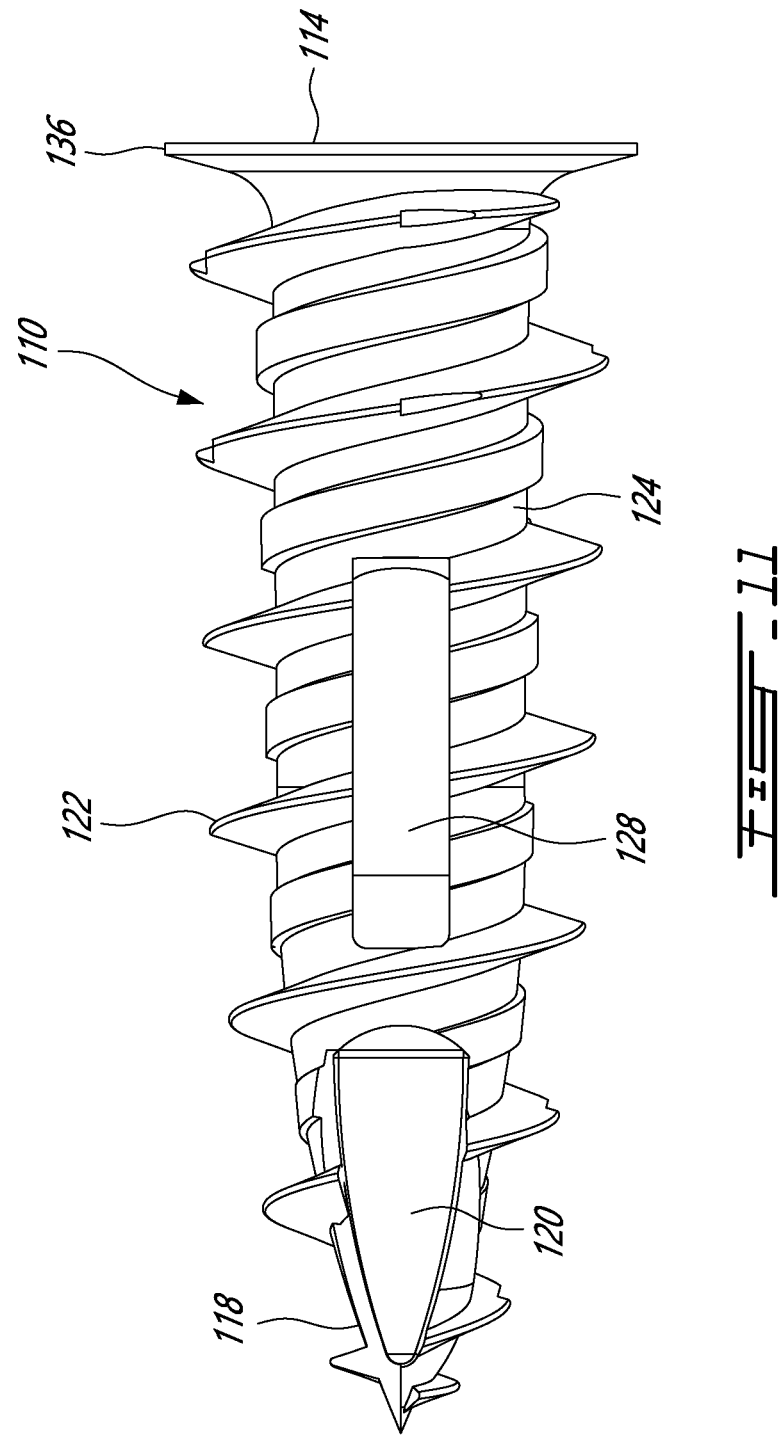
FIG. 11 is a side elevation view of the main body of FIGS. 9 and 10.
Figures 12, 13, 14:
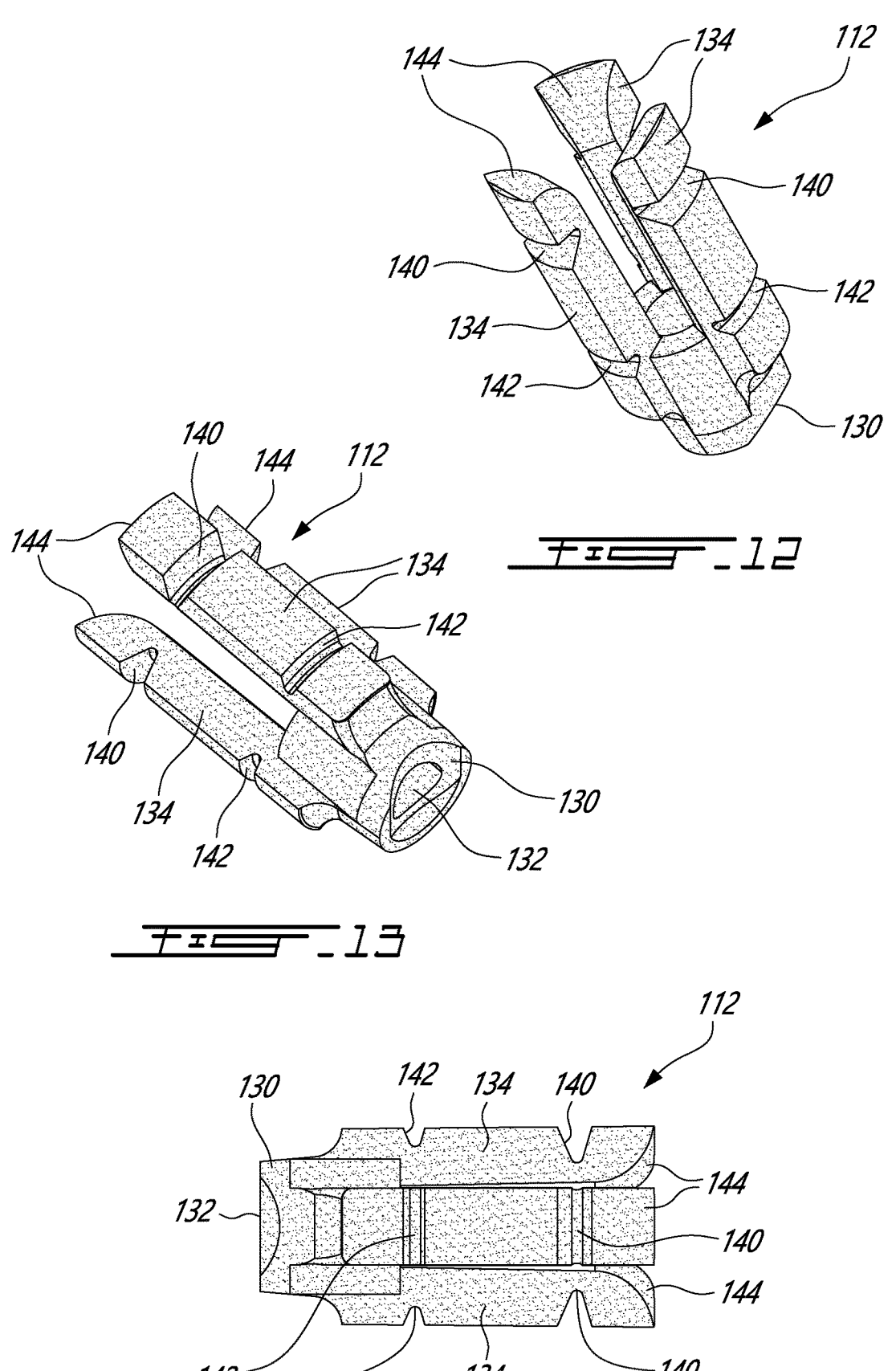
FIGS. 12 and 13 are perspective views of a deformable anchor member of the wall anchor of FIGS. 6 to 8, in accordance with an exemplary embodiment.
FIG. 14 is a side elevation view of the anchor member of FIGS. 12 and 13.

Now turning to FIGS. 6 to 17D, a variant wall anchor A' is illustrated in FIGS. 6 to 8, which wall anchor A' is similar to the wall anchor A of FIGS. 1 to 5, whereby in the following description and drawings that pertain to the wall anchor A', components of wall anchor A' which are identical in function and identical and/or similar in structure to corresponding components of the wall anchor A of FIG. 1 (and FIGS. 2 to 5) bear the same reference as in FIGS. 1 to 5, but are tagged with the prefix "1" and are thus in the hundreds with the last two digits thereof being identical to the reference numerals of corresponding components of wall anchor A. New components (or components not identified for wall anchor A) provided for wall anchor A' start at reference numeral 140.

Generally, both wall anchors A and A' are similar, except for there being four (4) longitudinal slots in wall anchor A, whereas there are three (3) such longitudinal slots in wall anchor A'. Also, the deformable expansion legs 134 in the wall anchor A' include distinct hinges. Furthermore, the pair of fins 26 of wall anchor A are replaced in wall anchor A' by a thread, which thread extends all the way to the distal end 118, being interrupted by the longitudinal slots 128 and by the open flute 120. As the thread in wall anchor A' extends to, and merges with, the outer tread provided at the distal end 118, the complete outer thread in anchor A', which extends from the proximal head 114 to the distal end 118, bears the reference numeral 122.

Therefore, FIGS. 6 to 8 illustrate a self-drilling bi-material wall anchor A', which is adapted to be mounted to the wall W for use with a fastener, such as the screw S. The wall anchor A' includes a rigid main body 110 and a deformable anchor member 112. The rigid main body 110 is typically made with a "charged" material (for instance, a plastic such as nylon that is reinforced with fiberglass) for cutting and penetrating the wall W. The deformable anchor member 112 is typically made of a "non charged" material (for instance, a plastic without fiberglass) to provide the required flexibility, e.g. in the legs 134. The two materials, namely the material of the rigid man body 110 and the material of the anchor member 112, are non-bounding materials to allow for their independent functions and, more particularly, for allowing the legs 134 of the latter to displace relative to the former while retaining their chemical integrity.

The main body 110 includes a proximal head 114, which defines a flange 136 and which is adapted to be engaged for instance by a powered bit, e.g. of Philips configuration, via the cruciform recess 116 defined in the Proximal head 114. The main body 110 also includes a distal end 118, with a "side" opening or open flute 120 being defined therein; with an outer thread 122 being provided on the distal end 118 although interrupted by the flute 120. As previously mentioned, the outer thread 122 in the wall anchor A' (distinctively from the outer thread 22 of the wall anchor A of FIGS. 1 to 5) extends from behind the flange 136 of the proximal head 114 generally continuously ail the way to the distal end 118, the outer thread 122 being interrupted by the longitudinal slots 128 and by the flute 120.

When the anchor A' is rotated, typically via a powered screwdriver bit engaged in the cruciform recess 116, the distal end 118 is adapted to dig into the wall W and allow the anchor A' to penetrate therein.

Between the proximal head 114 and the distal end 118, the main body 110 includes a central substantially cylindrical section 124, which defines the three longitudinal slots 128.

The deformable anchor member 112 includes a distal rigid body 130 defining a hole 132 that is adapted to be tapped by the screw S, and three (3) deformable expansion legs 134 located proximally of the rigid body 130. The anchor member 112 is positioned within the cylindrical section or shank 124 of the main body 110, and with the rigid body 130 acting basically as a nut (inwardly unthreaded or female-threaded) and being located substantially within a distal end of the cylindrical section 124 and with the deformable expansion legs 134 being lodged, in registry, along the longitudinal slots 128. The hole 132 could also define inner female threads that are adapted to mate with the male threads of the screw S.

To install the wall anchor A' in the wall W, a screwdriver bit is inserted in the recess 116 and the distal end 115 is abutted onto the wall W, typically on a visible surface of the hollow wall W. The screwdriver bit is rotated (typically via a powered drill) such that the distal end 118 pierces the wall W and the anchor A' is gradually introduced in the wall W, that is until the flange 136 of the proximal head 114 reaches the wall W. In this position, the anchor member 112 is located behind the wall W and the proximal section of the outer thread 122 is lodged in the wall W.

Figure 16A:
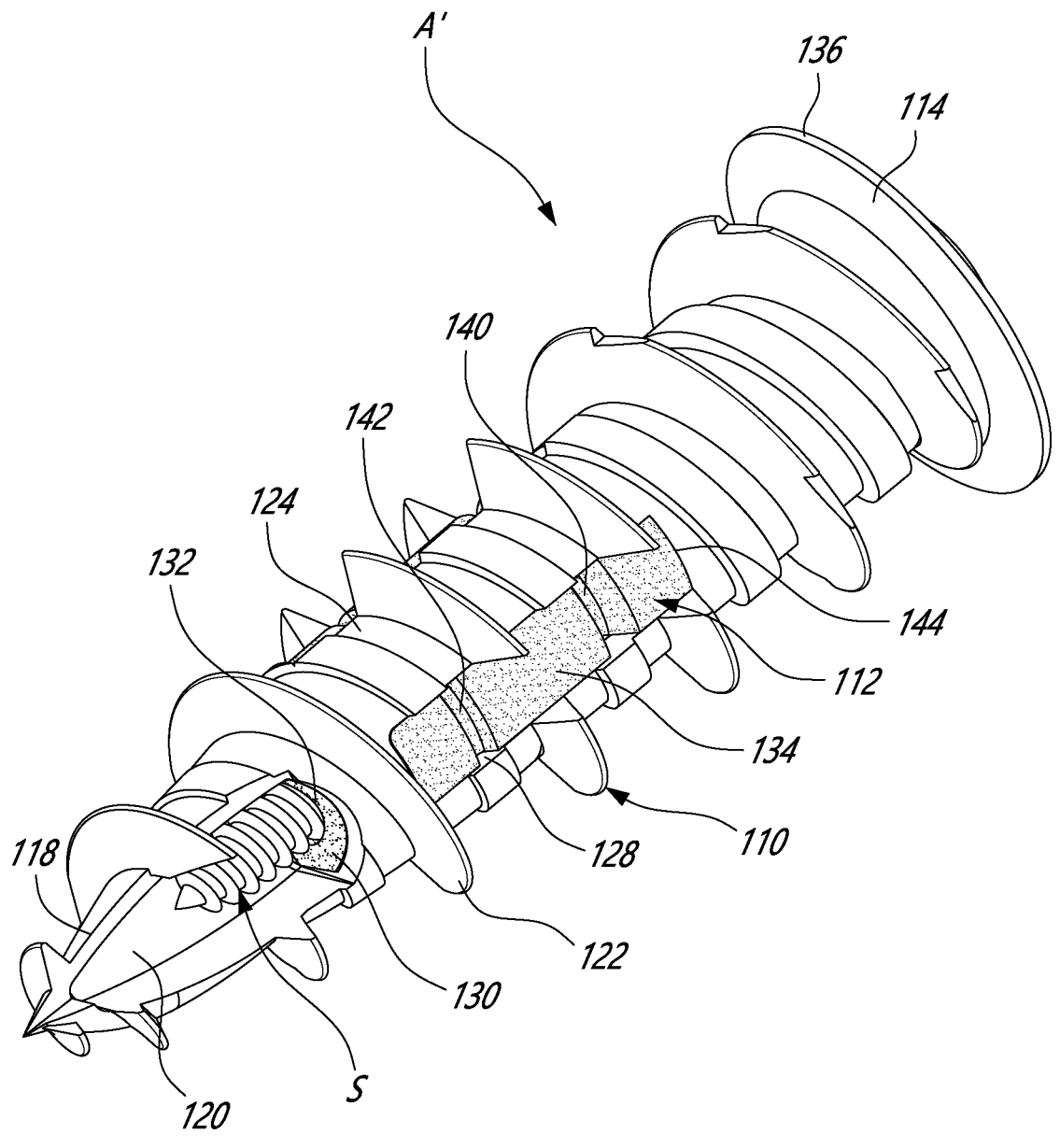
FIGS. 16A to 16C are sequential rear perspective views of the wall anchor of FIGS. 6 to 8, which views are similar to FIGS. 15A to 15C but taken from a different angle.
Figure 16B:
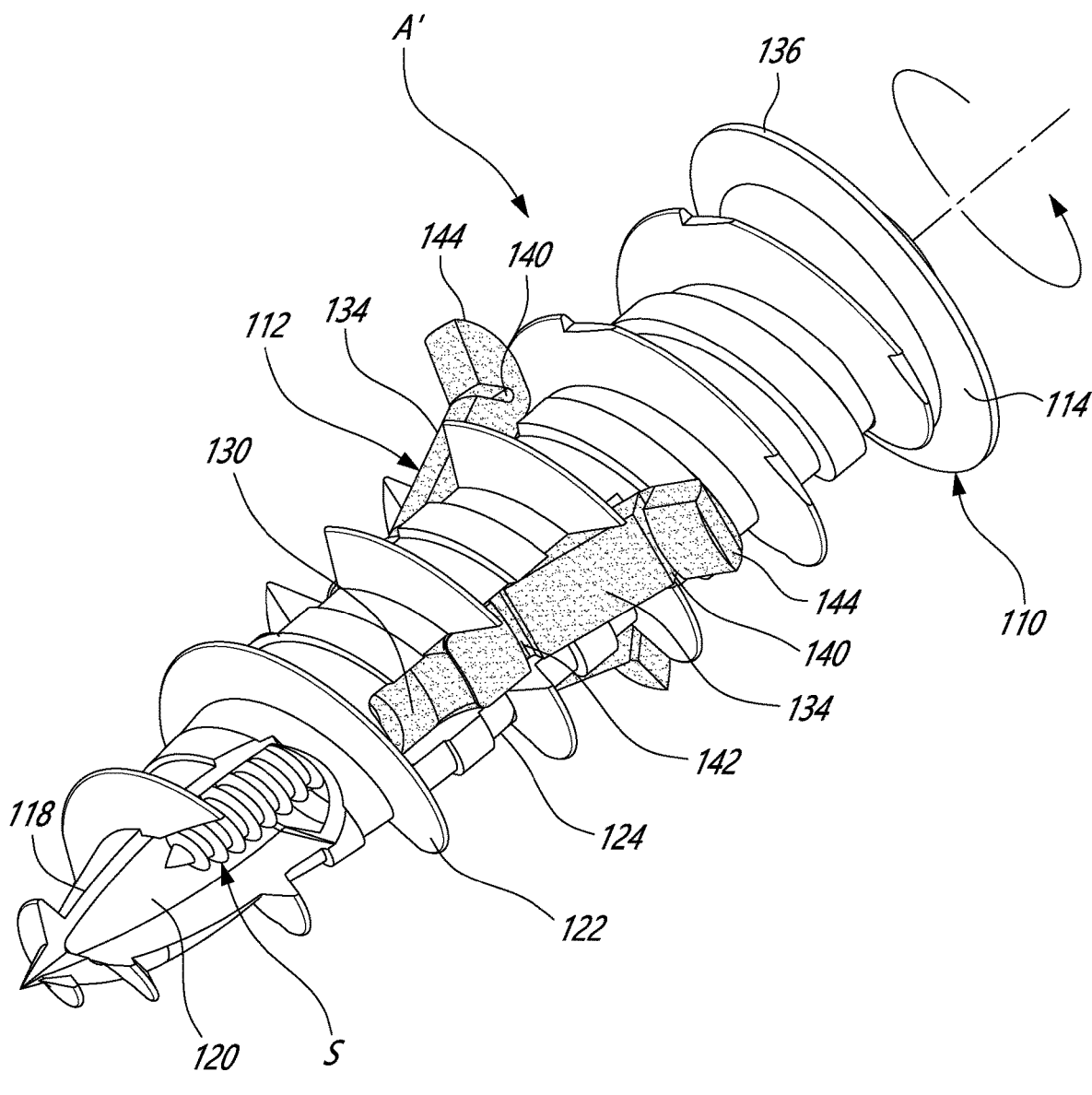
Figure 16C:
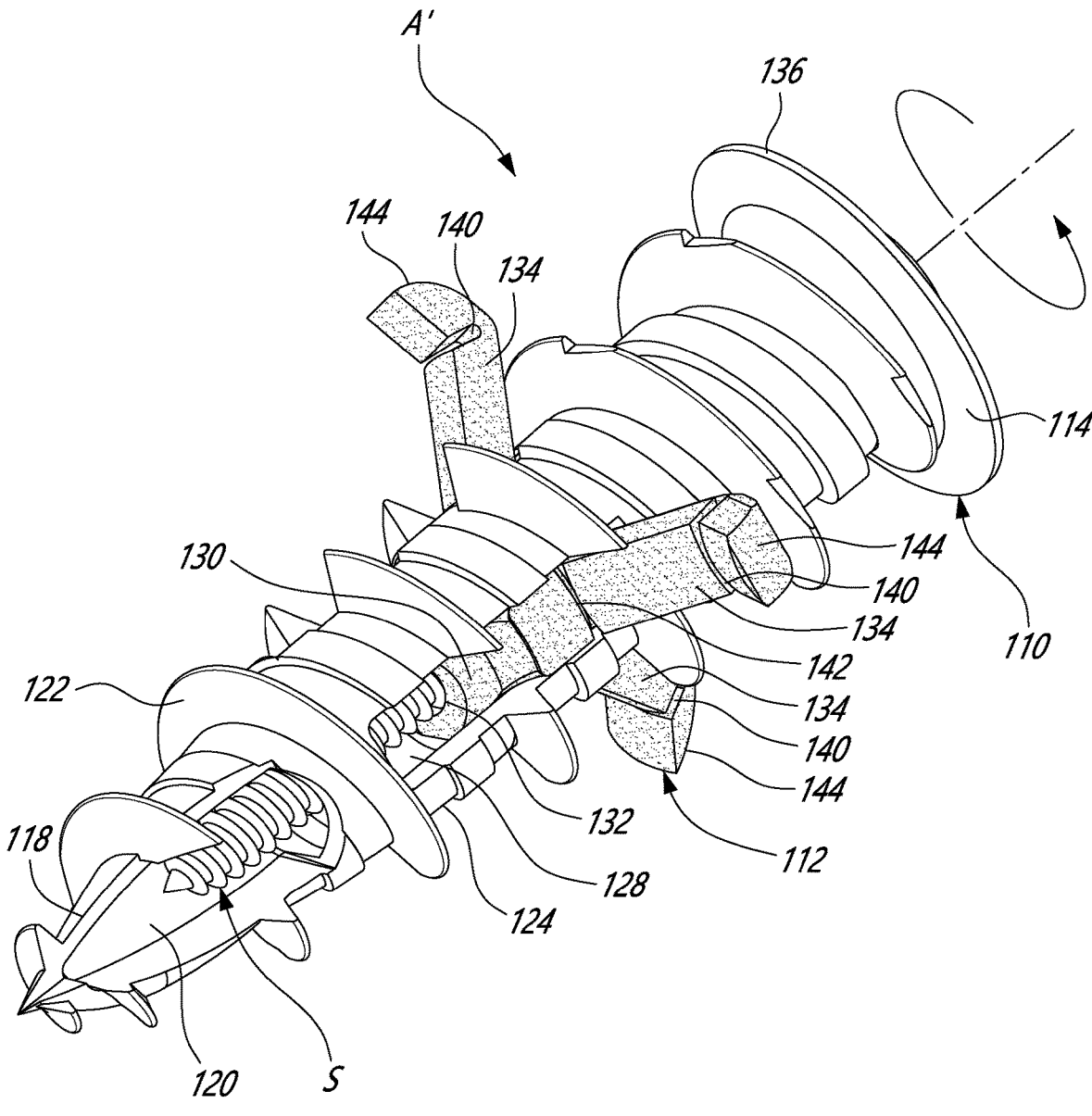
Figure 17B:
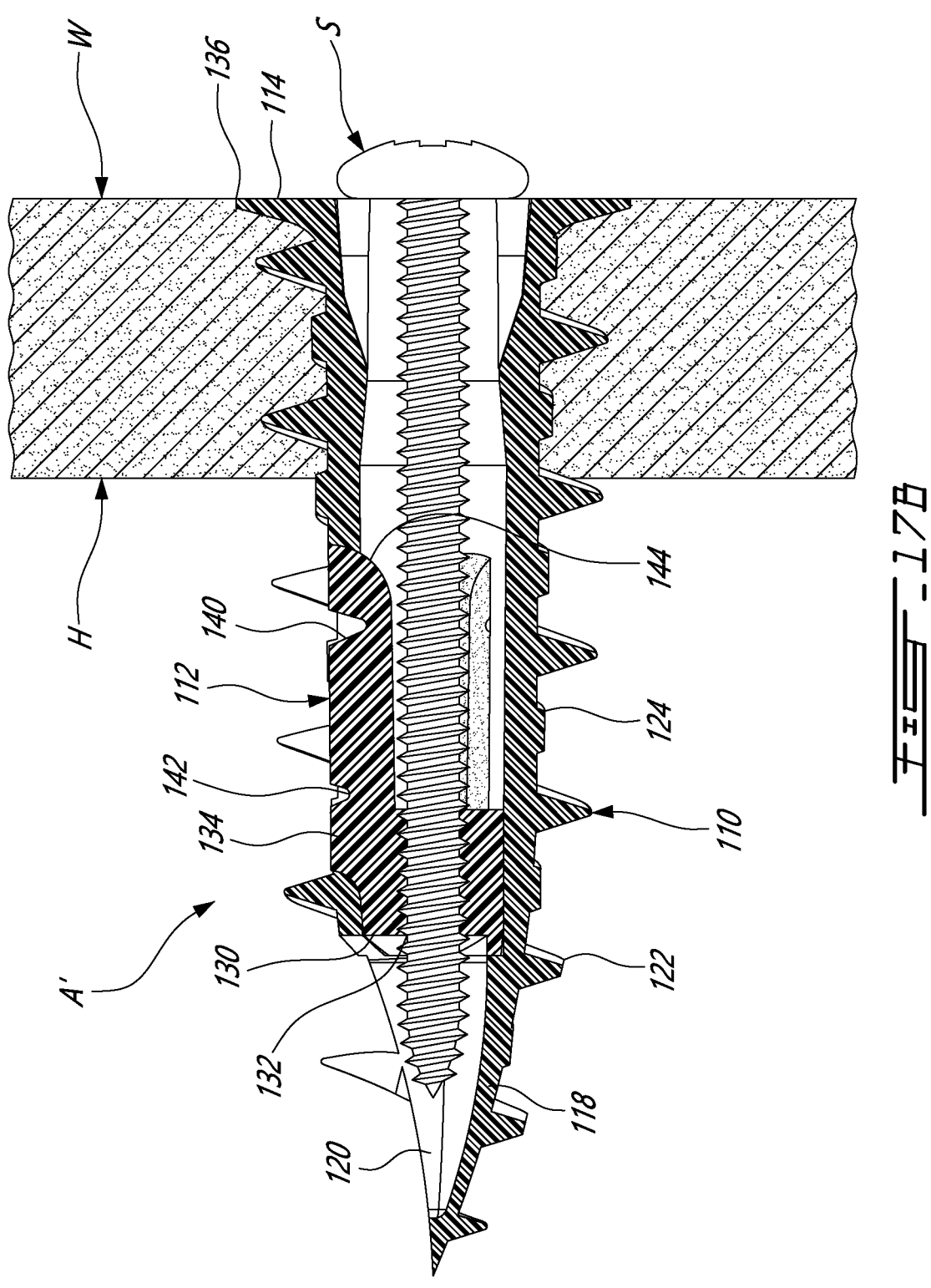

Then, the screw S is introduced in the anchor A' via the recess 116, and the screw S is adapted to eventually engage the rigid body 130 of the anchor member 112 at the hole 132 thereof, with the screw S either self-tapping the rigid body 130 or threadably engaging the internal thread of the rigid body 130 if the rigid body 130 already includes a female thread. Once a head of the screw S reaches the flange 136 of the proximal head 114, the screw S cannot further translationally advance, whereby continued rotation thereof (via the bit) causes the rigid body 130 to displace towards the wall W (as the rigid body 130 is threadably engaged to the screw S), thereby causing the deformable expansion legs 134 thereof to expand outwardly, through the slots 128, and into a general tripodal configuration, as seen in FIGS. 15C, 16C and 17D, wherein the expanded legs 134 extend radially beyond the outer threads 122. The expanded legs 134 abut the hidden side H of the wall W, thereby preventing the wall anchor A' from being pulled out of the wall W, with the wall anchor A' being thus firmly engaged to the wall W.

The wall anchor A' is held captive to the wall W both by the engagement of the proximal section of the threads 122 of the main body 110 within the wall W and by the legs 134 of the rigid body 130 abutting the hidden side H of the wall W.

Figure 17C:
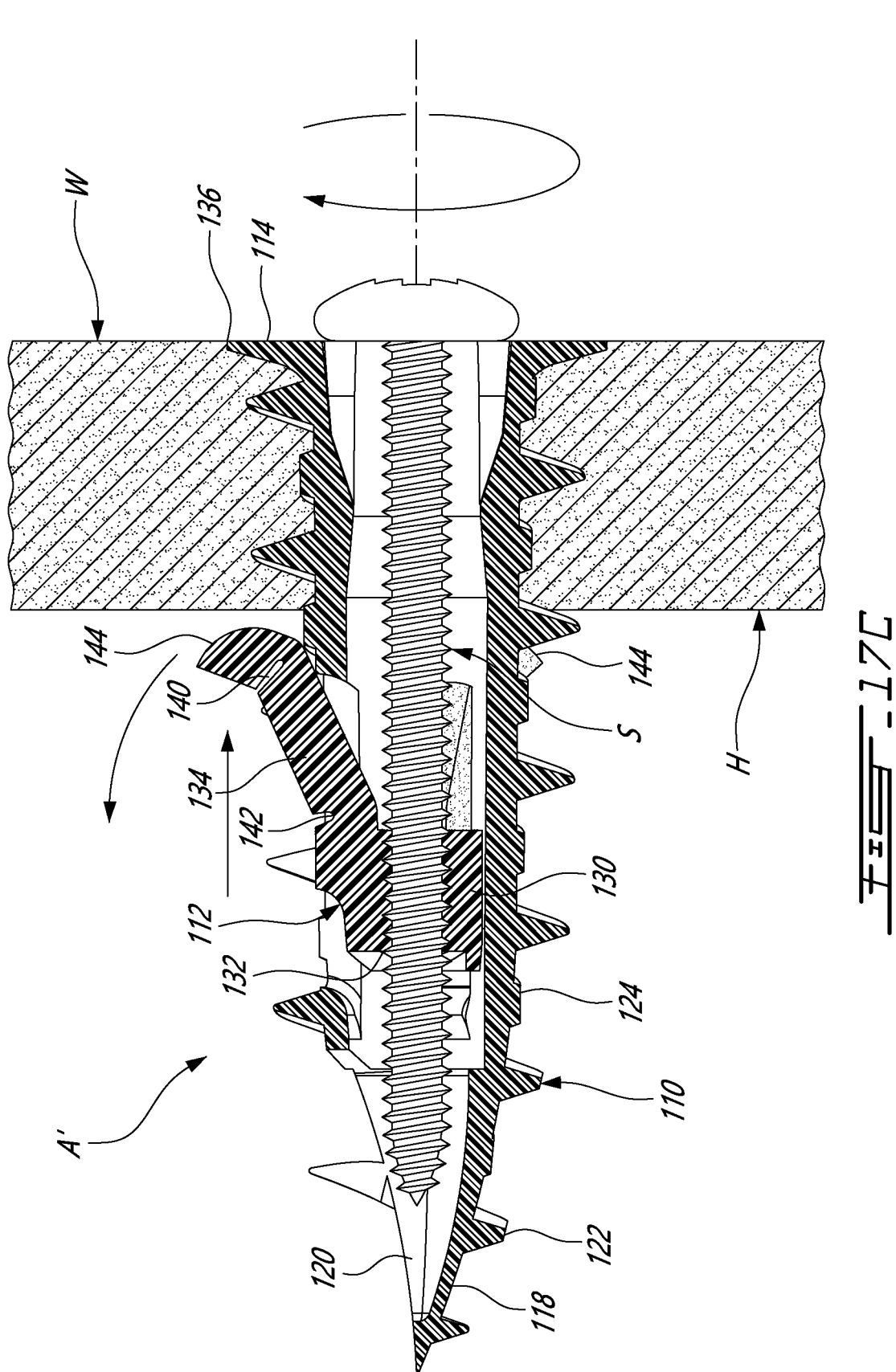

Each expansion leg 134 includes a pair of cuts defined in the outside thereof, which act as hinges, as well as an angled proximal foot 144. The proximal foot 144, when the anchor member 112 is pulled by the screw 8, is adapted to outwardly climb along the cylindrical portion 124 at a proximal end of the longitudinal slot 128, as seen in FIGS. 15B, 16B and 17C. At the end of the installation, the proximal foot 144 lies, generally flat, against the hidden side H of the wall W (see FIG. 17D).

As to the pair of cuts defined in each expansion leg 134, these cuts include a distal higher cut 142 and a typically more pronounced proximal lower cut 140. The distal higher cuts 142 are adapted to control the positioning of the legs 134 at the back of the wall W and a solid fold back of the distal portion of each leg 134, adjacent the rigid body 130. The proximal lower cuts 140 basically are adapted to force the proximal free end or foot 144 of each leg 134 to bind flat on the hidden side H of the wall W.

Typically, the anchor member 112 will include two, three or four expansion legs 134.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the embodiments and non-limiting, and it will be understood by persons skilled in the art that other variants and modifications may be made without departing from the scope of the embodiments as defined in the claims appended hereto.

The invention claimed is:

1. A wall anchor for mounting to a hollow wall, comprising a main body and an anchor member, the main body including a proximal end adapted to be engaged by a rotatable tool to rotate said anchor about a longitudinal axis thereof and to cause it to gradually engage a wall, a distal end adapted to cut through the wall as said anchor is rotated, and a shank between said proximal and distal ends, said shank defining at least one slot, the anchor member including at least one expandable leg and a body defining a hole, the body being located in an internal cavity defined in the shank, the expandable leg being in registry with the slot and being displaceable between inwardly collapsed and outwardly expanded positions, said expandable leg being in the collapsed position thereof when said anchor is rotated to mount it to the wall and being located distally past a rear surface of the wall once said anchor is mounted to the wall, said anchor being adapted to receive therein a threaded fastener and to threadably engage the body of the anchor member distally of said leg such that sufficient rotation of the threaded fastener retracts said body of the anchor member towards said proximal end thereby causing said expandable leg to extend outwardly through the slot to the expanded position of the expandable leg, wherein each one of the at least one expandable leg includes an angled proximal foot which is adapted, when the anchor member is retracted by the threaded fastener, to outwardly slide along an angled proximal end of the slot.

2. The wall anchor as defined in claim 1, wherein the main body and the anchor member are distinct components assembled together to form the anchor.

3. The wall anchor as defined in claim 1, wherein the main body and the anchor member are distinct components assembled together to form the anchor, wherein the main body is substantially rigid, whereas the at least one expandable leg of the anchor member is deformable.

4. The wall anchor as defined in claim 1, wherein the at least one expandable leg, when in the expanded position thereof, is adapted to abut the rear surface of the wall.

5. The wall anchor as defined in claim 1, wherein the at least one expandable leg extends from the body of the anchor member towards the proximal end of the main body.

6. The wall anchor as defined in claim 1, wherein there are provided at least three expandable legs and three associated slots, distributed substantially equidistantly along a periphery of the wall anchor.

7. The wall anchor as defined in claim 1, wherein each one of the at least one expandable leg includes at least one hinge for allowing each leg to pivot relative to the body of the anchor member.

8. The wall anchor as defined in claim 7, wherein each hinge includes a notch defined in an outer surface of the expandable leg.

9. The wall anchor as defined in claim 1, wherein each one of the at least one expandable leg includes at least two hinges, a first hinge located adjacent to a proximal free end of the expandable leg and a second hinge located proximally and adjacent to the body of the anchor member, the second hinge being adapted to allow the expandable leg to pivot relative to the body of the anchor member and at angle out of the slot, whereas the first hinge is adapted to allow the proximal free end of the expandable leg to abut firmly against the rear surface of the wall.

10. The wall anchor as defined in claim 1, wherein the main body is made of a "charged" material, namely wherein the material is reinforced with fiberglass.

11. The wall anchor as defined in claim 1, wherein the main body is made of a plastic which is reinforced with fiberglass, wherein the plastic is nylon.

12. The wall anchor as defined in claim 1, wherein the anchor member is made of a "non charged" material, for instance a plastic devoid of fiberglass, so as to provide the required flexibility to the anchor member.

13. The wall anchor as defined in claim 1, wherein the anchor member is made of a single component.

14. The wall anchor as defined in claim 1, wherein each one of the at least one expandable leg of the anchor member is adapted to displace towards the expanded position by interacting with the main body when the anchor member is retracted towards said proximal end of the main body.

15. The wall anchor as defined in claim 1, wherein, at the end of an installation of the wall anchor, the proximal foot is adapted to lie against the rear surface of the wall.

16. The wall anchor as defined in claim 1, wherein the anchor member is adapted to be retracted to at most a position where the proximal end of the slot abuts against a joint of the at least one leg.

17. A wail anchor for mounting to a hollow wail, comprising a main body and an anchor member, the main body including:

a proximal end adapted to be engaged by a rotatable tool to rotate said wall anchor about a longitudinal axis thereof and to cause it the wall anchor to gradually engage a wall;

a distal end adapted to cut through the wall as said anchor is rotated; and a shank between said proximal and distal ends, said shank having a substantially cylindrical section comprising an internal cavity, and defining at least one slot therein having an angled surface relative to the longitudinal axis thereof, and the anchor member including:

a body having a proximal end and an axial hole; and at least one expandable leg joined to the body thereof at a joint, and a body defining a hole, the body thereof being located in an the internal cavity defined in of the shank, with the at least one expandable leg being in registry with the at least one slot, and the at least one expandable leg being displaceable between i) an inwardly collapsed position wherein the at least one expandable leg registers within the at least one slot and a cylindrical outer surface of the shank, and ii) an outwardly expanded positions wherein the at least one expandable leg extends at least partially outside the at least one slot, said expandable leg being in the collapsed position thereof when said anchor is rotated to mount it to the wall and being located distally past a rear surface of the wall once said anchor is mounted to the wall, said anchor being adapted to receive therein a threaded fastener and to threadably engage the body of the anchor member distally of said leg such that sufficient rotation of the threaded fastener retracts said body of the anchor member towards said proximal end thereby causing said expandable leg to extend outwardly through the slot to the expanded position of the expandable leg, wherein the at least one expandable leg is in the collapsed position thereof when said wail anchor is rotated to mount it to the wall until the slot is substantially past a rear surface of the wall, and wherein said wall anchor is adapted to receive therein a threaded fastener engaging the body of the anchor member, wherein rotating the threaded fastener causes the body of the anchor member to retract towards the proximal end of the main body thereby causing the at least one expandable leg to slide over the angled surface of the slot forcing the leg to extend outwardly through the slot, and wherein the at least one leg is adapted to gradually increase pressure over the rear surface of the wall as the body of the anchor member is retracted.

\*   \*   \*   \*   \*